United States Patent
Nichols et al.

(10) Patent No.: US 12,281,773 B2
(45) Date of Patent: Apr. 22, 2025

(54) LIGHTING SYSTEM

(71) Applicant: Avid Labs, LLC, Fort Wayne, IN (US)

(72) Inventors: Joel A. Nichols, Columbia City, IN (US); Dominic Picciuto, Crestview Hills, KY (US)

(*) Notice: Subject to any disclaimer, the term of this patent is extended or adjusted under 35 U.S.C. 154(b) by 204 days.

(21) Appl. No.: 18/169,411

(22) Filed: Feb. 15, 2023

(65) Prior Publication Data

US 2023/0194066 A1    Jun. 22, 2023

Related U.S. Application Data

(63) Continuation-in-part of application No. 17/818,092, filed on Aug. 8, 2022, now Pat. No. 12,108,509,
(Continued)

(51) Int. Cl.
| | |
|---|---|
| *F21S 43/14* | (2018.01) |
| *B62J 6/03* | (2020.01) |
| *B62J 6/26* | (2020.01) |
| *F21V 23/04* | (2006.01) |
| *F21W 107/13* | (2018.01) |
| *F21Y 113/00* | (2016.01) |

(52) U.S. Cl.
CPC ............. *F21S 43/14* (2018.01); *B62J 6/03* (2020.02); *B62J 6/26* (2020.02); *F21V 23/0464* (2013.01); *F21W 2107/13* (2018.01); *F21Y 2113/30* (2023.05)

(58) Field of Classification Search
CPC ...... F21S 43/14; B62J 6/03; B62J 6/26; F21V 23/0464
See application file for complete search history.

(56) References Cited

U.S. PATENT DOCUMENTS

| | | | | |
|---|---|---|---|---|
| 4,782,432 A | * | 11/1988 | Coffman | F21V 23/0435 |
| | | | | 362/171 |
| 5,704,707 A | * | 1/1998 | Gebelein | A42B 3/0453 |
| | | | | 362/802 |

(Continued)

FOREIGN PATENT DOCUMENTS

| | | |
|---|---|---|
| EP | 3760522 A1 | 1/2021 |
| GB | 2336658 A | 10/1999 |

(Continued)

*Primary Examiner* — Bryon T Gyllstrom

(57) ABSTRACT

A lighting system includes a lighting device arranged to attach to a vehicle. The lighting device includes at least two ultraviolet lights and at least one sensor. The sensor determines whether any of at least two areas or zones adjacent to the lighting device are poorly visibly illuminated and/or occupied by personnel, and illuminates these areas or zones with ultraviolet light. The lighting system is configured to operate in conjunction with existing emergency visible lighting and/or flashing visible light systems by using the sensors to sense visible illumination of each individual area or zone provided by the existing emergency visible lighting and flashing visible light systems. The lighting system may be configured to synchronize the illumination of each individual area or zone in ultraviolet light with intermittent absence of visible light illumination in each area or zone from the existing emergency visible lighting and flashing visible light systems.

20 Claims, 11 Drawing Sheets

Related U.S. Application Data which is a continuation-in-part of application No. 17/475,218, filed on Sep. 14, 2021, now Pat. No. 11,466,833, which is a continuation-in-part of application No. 17/111,605, filed on Dec. 4, 2020, now abandoned, and a continuation-in-part of application No. 17/076,738, filed on Oct. 21, 2020, now Pat. No. 11,457,517, said application No. 17/818,092 is a continuation-in-part of application No. 17/076,738, filed on Oct. 21, 2020, now Pat. No. 11,457,517.

(60) Provisional application No. 62/943,560, filed on Dec. 4, 2019, provisional application No. 62/924,363, filed on Oct. 22, 2019.

(56) References Cited

U.S. PATENT DOCUMENTS

| | | | | |
|---|---|---|---|---|
| 6,095,661 | A * | 8/2000 | Lebens | H05B 45/12 362/159 |
| 6,166,496 | A * | 12/2000 | Lys | A61N 5/0616 315/316 |
| 6,997,584 | B1 * | 2/2006 | Rothan | B62J 6/015 362/240 |
| 2004/0170014 | A1 * | 9/2004 | Pritchard | F21V 21/06 362/555 |
| 2008/0218998 | A1 * | 9/2008 | Quest | G01N 21/91 73/40 |
| 2011/0075403 | A1 * | 3/2011 | Niezrecki | B62J 6/015 362/183 |
| 2015/0209457 | A1 | 1/2015 | Bonutti et al. | |
| 2017/0167706 | A1 * | 6/2017 | Yang | F21L 4/027 |
| 2017/0210282 | A1 | 7/2017 | Rodriguez Barros | |
| 2018/0372301 | A1 * | 12/2018 | Kobayashi | F21V 7/16 |

FOREIGN PATENT DOCUMENTS

| | | |
|---|---|---|
| GB | 2568113 A | 5/2019 |
| WO | WO2020/161443 A1 | 8/2020 |

\* cited by examiner

LIGHTING SYSTEM

CROSS REFERENCE TO RELATED APPLICATIONS

This is a Continuation-In-Part claiming priority to U.S. non-provisional application Ser. No. 17/818,092 entitled "LIGHTING SYSTEM", filed Aug. 8, 2022, which is a Continuation-In-Part claiming priority to U.S. non-provisional application Ser. No. 17/475,218 entitled "LIGHTING SYSTEM", filed Sep. 14, 2021, which is a Continuation-In-Part claiming priority to U.S. non-provisional application Ser. No. 17/111,605 entitled "LIGHTING SYSTEM", filed Dec. 4, 2020, which is based upon U.S. provisional patent application Ser. No. 62/943,560, entitled "LIGHTING SYSTEM", filed Dec. 4, 2019. U.S. non-provisional application Ser. No. 17/475,218 also claims priority to U.S. non-provisional application Ser. No. 17/076,738 entitled "LIGHTING SYSTEM", filed Oct. 21, 2020, which is based on U.S. provisional patent application Ser. No. 62/924,363 entitled "LIGHTING SYSTEM", filed Oct. 22, 2019. U.S. non-provisional application Ser. No. 17/818,092 also claims priority directly to U.S. non-provisional application Ser. No. 17/076,738. Each of the above listed applications are incorporated herein by reference.

BACKGROUND OF THE INVENTION

1. Field of the Invention

The invention relates to auxiliary lighting systems, and, more particularly, to a lighting system for a transportation device which emits both visible light and non-visible light.

2. Description of the Related Art

Low-light conditions may present a hazard to individuals who are not well-lit. Personal protective equipment, such as a reflective or reflectance clothing, is often used to promote visibility. However, personal protective equipment may not be effective if such equipment is not sufficiently illuminated. Thereby, individuals may need to be sufficiently illuminated by various auxiliary lights. Some auxiliary lights may include light emitting diodes (LEDs). The introduction of LED lighting technology has reduced much of the ultraviolet (UV) radiation emitted from an artificial source to near zero. While the efficiency of the LED lighting is very desirable, the use thereof alters the spectral breadth of the light being produced. The lack of UV light degrades the effectiveness of safety markings placed on equipment, vehicles, and clothing worn by operators or security personnel, in that many of such markings are designed to fluoresce, which requires the presence of UV spectral power.

UV light is an electromagnetic radiation with a wavelength from roughly 10 nm (30 PHz) to 385 nm (750 THz), which is a shorter wavelength than that of visible light but longer than X-rays. UV radiation is present in sunlight, and also produced by electric arcs and specialized lights such as mercury-vapor lamps, tanning lamps, and black lights. Although the UV light lacks the energy to ionize atoms, long-wavelength ultraviolet radiation can influence chemical reactions, and causes many substances to glow or fluoresce. Therefore, known artificial lighting systems may ineffectually illuminate equipment or individuals in low-light conditions. It is noted that electromagnetic radiation having a wavelength less than 385 nm is considered UV, and visibility with the naked eye generally ceases at wavelengths below 365 nm. That being said, electromagnetic radiation having a wavelength of 395 nm typically still produces fluorescence in materials, although the light may be visible to the naked eye.

Moreover, an area that is being illuminated may vary in the amount of background illumination present. Some areas or zones in a work zone or emergency scene may be especially poorly illuminated, even when occupied by workers or emergency personnel. This may occur despite the presence of temporary lighting and/or flashing emergency lights in the surrounding spaces. Accordingly, there is an unmet need for a lighting system that provides needed ultraviolet radiation directed to individual areas or zones that are otherwise poorly visibly illuminated and/or occupied by personnel, in order to improve visibility of equipment and individuals in low light conditions.

SUMMARY OF THE INVENTION

The invention provides a lighting system that includes a lighting device for emanating visible light and ultraviolet light. In a non-limiting exemplary embodiment, the lighting device may be one or more lighting devices which are removably or permanently mounted on a transportation device. The lighting device may include a body, at least one visible light source connected to the body, and at least one ultraviolet light source connected to the body. Alternately, the lighting device may include a body having just the at least one ultraviolet light source connected to the body. In these and other embodiments, the lighting device may include a control device for strobing or flashing the visible light and the ultraviolet light on and off. When the visible light is off, the ultraviolet light is turned on in order to provide a secondary or additional light which radiates from a reflectance material of an object. In each embodiment, the at least one ultraviolet light source can illuminate one or more objects, including clothing of the operator of the transportation device, workers and other personnel near to the transportation device, and other objects having such reflectance materials near to the transportation device.

In at least one embodiment of the present lighting system, one or more optical sensors, visible light sensors, motion sensors, heat sensors, infrared sensors, personnel sensors, and/or cameras may monitor multiple areas or zones, in order that a control device of the lighting system may cause UV light sources of the lighting system to bathe such individual areas or zones in ultraviolet light when the individual zone is determined to be poorly visibly illuminated and/or occupied by personnel. Such multiple areas or zones may encompass a region only partially surrounding the lighting system, or may encompass an entire 360 degrees around the lighting system. If a camera is used, the camera may be used by the control device of the lighting system to look for movement, people, and/or ambient visible light or visible light from existing emergency visible lighting and flashing visible light systems.

In such an embodiment of the present lighting system, the lighting system may be implemented having its own visible lights, such as amber lights, or may not be provided with its own visible lights, and instead be used in conjunction with existing emergency visible lighting and flashing visible light systems. Whether or not the lighting system is provided with its own visible lights, the lighting system may be used in conjunction with existing emergency visible lighting and flashing visible light systems by way of sensing visible illumination of each individual area or zone provided by such existing emergency visible lighting and flashing visible light systems. The lighting system may sense visible illumination of each individual area or zone provided by such existing emergency visible lighting and flashing visible light systems using its own optical sensors, visible light sensors, and/or camera. Alternatively, the lighting system may determine visible illumination of each individual area or zone provided by such existing emergency visible lighting and flashing visible light systems by way of wired or wireless connections with such existing emergency visible lighting and flashing visible light systems.

In this case, a control device of the lighting system, using the lighting system's one or more optical sensors, visible light sensors, motion sensors, heat sensors, infrared sensors, personnel sensors, and/or cameras, and/or wired or wireless connections, may time and adjust the illumination of each individual area or zone in ultraviolet light, in order to synchronize the illumination of each individual area or zone in ultraviolet light with the intermittent absence of visible light illumination in each individual area or zone from existing emergency visible lighting and flashing visible light systems. The control device of the lighting system may synchronize the illumination of each individual area or zone in ultraviolet light with the intermittent absence of visible light illumination in each individual area or zone from existing emergency visible lighting and flashing visible light systems on a constant basis, or may do so intermittently, relying on the regularity of the existing emergency visible lighting and flashing visible light systems to maintain synchronization in between synchronization events. In other words, the control device of the lighting system may intermittently skip illuminating each individual area or zone in ultraviolet light, in order to update and verify the timing of the synchronization with the existing emergency visible lighting and flashing visible light systems.

In another embodiment of the present lighting system, additional optical ultraviolet light sensors may also monitor the multiple areas or zones, in order that the control device of the lighting system may cause UV light sources of the lighting system to bathe such individual areas or zones in ultraviolet light only when other UV light sources are not doing so. The control device of the present lighting system may again time and adjust the illumination of each individual area or zone in ultraviolet light in order to synchronize the illumination of each individual area or zone in ultraviolet light with the intermittent absence of ultraviolet light illumination in each individual area or zone from existing ultraviolet lighting systems.

In another embodiment of the present lighting system, the control device of the lighting system may synchronize the illumination of each individual area or zone in ultraviolet light with the intermittent absence of visible light illumination in each individual area or zone from existing emergency visible lighting and flashing visible light systems asymmetrically. That is to say, if the duration of "on" periods and "off" periods of the visible light illumination of a given area or zone provided by existing emergency visible lighting and flashing visible light systems are for non-limiting example approximately equal in duration, the control device will nevertheless impose a slightly longer period of ultraviolet light illumination of that individual area or zone that includes the entire "off" period of visible light illumination and overlaps part of the "on" period of visible light illumination, either before or after the "off" period of visible light illumination, or both. Conversely, in this non-limiting example, the control device will also impose a slightly shorter period during which there is no ultraviolet light illumination of that individual area or zone that does not include the entirety of the "on" period of visible light illumination. In this way, a stronger pulse of ultraviolet light illumination may be produced without overheating the circuitry of the ultraviolet LEDs or their control circuitry.

It is further contemplated that the aforementioned embodiment may be implanted in reverse. That is to say, the control device will instead impose a slightly shorter period of ultraviolet light illumination of that individual area or zone that does not include the entire "off" period of visible light illumination, and a slightly longer period during which there is no ultraviolet light illumination of that individual area or zone that includes the entire "on" period of visible light illumination, and overlaps part of the "off" period of visible light illumination, either before or after the "on" period of visible light illumination, or both.

Furthermore, the transitions between the periods of ultraviolet light illumination and the periods of no ultraviolet light illumination may be nearly instantaneous, or as fast as the LEDs or other ultraviolet lighting devices can switch from no ultraviolet light production to full ultraviolet light production. Alternately, circuitry and/or programming may be provided, within the control device of the lighting system or otherwise connected to the lighting system, that ramps the LEDs or other ultraviolet lighting devices between no ultraviolet light production to full ultraviolet light production and vice versa. In this way, overheating of the circuitry of the LEDs or their control circuitry is further avoided.

In another embodiment of the present lighting system, wireless devices carried by personnel may communicate with the lighting system, in order to provide proximity and/or location information of the personnel to the lighting system. In this way, the lighting system may synchronize the illumination of a given individual area or zone in ultraviolet light with the continuous or intermittent absence of visible light illumination in the given individual area or zone from existing emergency visible lighting and flashing visible light systems only when at least one person is present in that individual area or zone. In each of the aforementioned embodiments of the lighting system, the ultraviolet lights of the lighting system when illuminated cause a reflectance material of an object to convert the ultraviolet light to a visible wavelength of light which radiates from the object. The object may, for non-limiting example, be apparel such as a safety vest or other garment, which may in turn be part of OSHA/EPA Level A, B, C, or D civilian Personal Protective Equipment (PPE), NFPA Class 1, 2, 3, or 4 PPE, MOPP Ready, 0, 1, 2, 3, or 4, and/or ANSI/ISEA 107-2020 Type 0, R, P, and/or Performance Class 1, 2, or 3, or Supplemental Class E PPE.

Ultraviolet light, for the purpose of the present lighting system, generally means electromagnetic radiation with a wavelength from roughly 10 nm (30 PHz) to 385 nm (750 THz). However, embodiments of the present lighting system may effectively utilize light further extending into the range of 385 nm to 445 nm, for non-limiting example from 315 nm to 400 nm, or may even utilize light within the range of 385 nm to 445 nm exclusively. Specifically, ultraviolet light producing sources such as LEDs or other devices sometimes produce light within a Gaussian spectral distribution of wavelengths, typically centered about a target wavelength. For non-limiting example, an LED designed to emit light between 385 nm and 400 nm in wavelength may still produce approximately thirty percent of its total light output at a wavelength of less than 365 nm. While pure ultraviolet light is considered to include light at wavelengths of no greater than 400 nm, and the range between 400 nm and 445 nm is considered "violet", with 445 nm referred to as "getting into blue", the range of electromagnetic radiation between 380 nm and 450 nm typically still includes some percentage of ultraviolet light at the lower end of the Gaussian spectral distribution. This is true even for high quality LEDs with a tight 445 nm spectrum by industry standards.

The invention in one form is directed to a lighting system. The lighting system includes a lighting device configured to be connected to an object. The lighting device includes a body, at least one visible light source connected to the body, and at least one ultraviolet light source connected to the body. The at least one visible light source is configured for emitting visible light. The at least one ultraviolet light source is configured for emitting ultraviolet light. The at least one ultraviolet light source is operably coupled to the at least one visible light source. The lighting device is configured for strobing the at least one visible light source and the at least one ultraviolet light source by turning the at least one ultraviolet light source on upon the at least one visible light source turning off and turning the at least one ultraviolet light source off upon the at least one visible light source turning on in such a way that a reflectance material of an object, which is not being illuminated by the at least one visible light source, is illuminated by the at least one ultraviolet light source. The at least one ultraviolet light source emits ultraviolet light in a wavelength range from 10 nm to 445 nm.

The invention in another form is directed to a lighting system that includes a lighting device configured to be connected to an object. The lighting device includes a body. At least one ultraviolet light source is connected to the body. The at least one ultraviolet light source is configured for emitting ultraviolet light. The lighting device is configured for cooperating with at least one existing visible light source. The lighting device is configured for turning on and turning off the at least one ultraviolet light source in cooperation with the at least one existing visible light source. The lighting device is a stand-alone lighting device. The at least one ultraviolet light source emits ultraviolet light in a wavelength range from 10 nm to 445 nm.

The invention in another form is directed to a lighting system that includes a lighting device configured to be attached to a transportation device. The lighting device includes a body. At least one forward facing visible light source is connected to the body. The at least one forward facing visible light source is configured for emitting visible light in a forward direction relative to the transportation device. At least one rearward facing ultraviolet light source is connected to the body. The at least one rearward facing ultraviolet light source is configured for emitting ultraviolet light in a rearward direction relative to the transportation device in such a way that a reflectance material of an object, which is not being illuminated by the at least one forward facing visible light source, is illuminated by the at least one rearward facing ultraviolet light source. A control device is operably connected to the at least one forward facing visible light source and to the at least one rearward facing ultraviolet light source. The control device is configured for turning on and off the at least one forward facing visible light source and the at least one rearward facing ultraviolet light source. At least one light sensor is operably connected to the control device. The at least one light sensor is configured for sensing ambient light and for providing a signal to the control device. The control device is configured for turning the at least one rearward facing ultraviolet light source on and off responsive to the signal of the at least one light sensor. The at least one rearward facing ultraviolet light source emits ultraviolet light in a wavelength range from 10 nm to 445 nm.

The invention in another form is directed to a lighting system that includes a lighting device configured to be connected to an object. The lighting device includes a body and a control device. At least two ultraviolet light sources are connected to the body and are operably coupled to the control device. The at least two ultraviolet light sources are configured for emitting ultraviolet light. At least one sensing device is connected to the body. The at least one sensing device is configured to determine whether any of at least two areas or zones adjacent to the lighting device are poorly visibly illuminated and/or occupied by personnel. The lighting device is configured to illuminate with ultraviolet light any of the at least two areas or zones adjacent to the lighting device upon a determination that the area or zone concerned is poorly visibly illuminated and/or occupied by personnel. The at least two ultraviolet light sources emit ultraviolet light in a wavelength range from 10 nm to 445 nm.

One advantage of certain embodiments of the invention is that the lighting system dually emits UV light and visible light. In certain embodiments of the invention, the dual emission of UV light and visible light may be for illuminating an area in front of the individual and transportation device and illuminating an object being worn by the individual. Another advantage of certain embodiments of the invention is that the UV light and the visible light emit in opposing directions for illuminating the individual and an area in front of the individual. Another advantage of certain embodiments of the invention is that the lighting system prolongs the life of the UV light.

Another advantage of certain embodiments of the invention is that, by monitoring multiple areas or zones and bathing such individual areas or zones in ultraviolet light when the individual zone is determined to be poorly illuminated and/or occupied by personnel, is that such embodiments of the invention target dangerous dark areas and energize safety vests worn by personnel in those poorly illuminated areas. By using the lighting system's one or more light sensors, motion sensors, heat sensors, infrared sensors, personnel sensors, and/or cameras, and by timing and synchronizing the illumination of each individual area or zone in ultraviolet light with the intermittent absence of visible light illumination in each individual area or zone from existing emergency lighting and flashing light systems, such embodiments of the present invention are able to adjust to the real-time lighting environment and increase the safety of illuminated personnel in each individual area or zone.

An advantage of embodiments of the present invention that utilize light further extending into the range of 385 nm to 445 nm, for non-limiting example from 315 nm to 400 nm, or that even utilize light within the range of 385 nm to 445 nm exclusively, is that doing so may be safer for the health of persons exposed to the ultraviolet light. Furthermore, ultraviolet light of lesser wavelengths may degrade the plastics from which the lenses of the present invention are made. "UV degradation is one form of polymer degradation that affects plastics exposed to [ultraviolet light]. The problem appears as discoloration or fading, cracking, loss of strength or disintegration."[1] By using light extending into the range of 385 nm to 445 nm, for non-limiting example from 315 nm to 400 nm, or even light within the range of 385 nm to 445 nm exclusively, the present lighting system still provides secondary or additional light which radiates from a reflectance material of an object, while avoiding the aforementioned detrimental effects to persons and to the plastic lenses of the lighting system. Moreover, in certain instances, LEDs having wavelengths centered about 395 nm may be more cost effective than those having wavelengths centered about 365 nm, allowing for the safety benefits of the present invention to be accomplished at a lower cost.

[1] Ultraviolet. 8 Feb. 2023. Retrieved 13 Feb. 2023. https://en.wikipedia.org/wiki/Ultraviolet

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplification are not to be construed as limiting the scope of the invention in any manner.

DETAILED DESCRIPTION OF THE INVENTION

The following detailed description and appended drawing describe and illustrate various exemplary embodiments of the invention. The description and drawings serve to enable one skilled in the art to make and use the invention, and are not intended to limit the scope of the invention in any manner. In respect of any methods disclosed and illustrated, the steps presented are exemplary in nature, and thus, the order of the steps is not necessary or critical.

As used herein, the term visible light refers to the spectrum of light which the human eye can see without the aid of some device. The term non-visible light refers to what the human eye cannot see without the aid of some device. As noted previously, ultraviolet light, for the purpose of the present lighting system, generally means electromagnetic radiation with a wavelength from roughly 10 nm (30 PHz) to 385 nm (750 THz), although embodiments of the present lighting system may effectively utilize light further extending into the range of 385 nm to 445 nm, for non-limiting example from 315 nm to 400 nm, or may even utilize light within the range of 385 nm to 445 nm exclusively.

Figure 1:
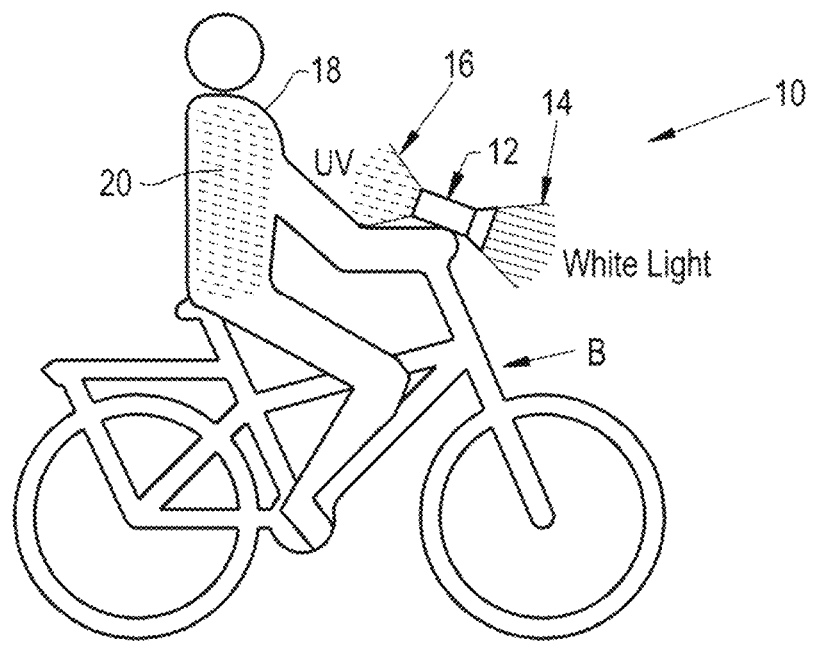
FIG. 1 is a schematic view of a lighting system according to an embodiment of the invention, wherein the lighting system is removably coupled to a transportation device and is operating in a dual state for emanating nonvisible and visible light, as described herein.
Figure 2:
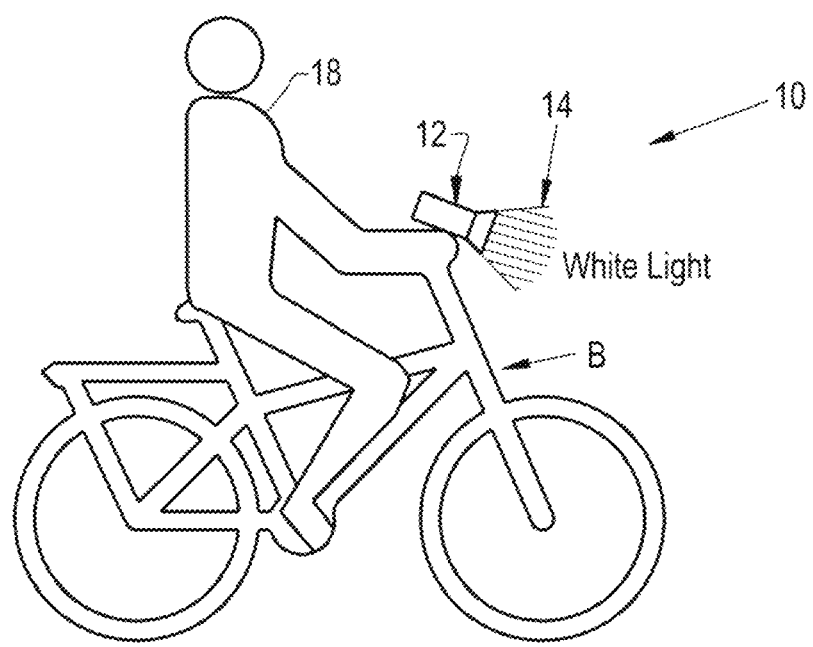
FIG. 2 is a schematic view of the lighting system of FIG. 1, wherein the lighting system is operating in a visible light state for emanating only visible light, as described herein.

Referring now to the drawings, and more particularly to FIGS. 1 and 2, a lighting system 10 is shown in schematic form. The lighting system 10 may be in the form of a light source 12 that may be removably mounted to a transportation device, such as a gas or electric powered vehicle, or a man-powered vehicle. The transportation device may, for non-limiting example, be in the form of a bicycle B. The light source 12 has a body and emits visible light 14 and non-visible light 16. The non-visible light 16 may be in the form of UV light 16.

When UV light 16 illuminates and interacts with reflectance material 18, the reflectance material 18 will convert UV light 16 into visible light 20 to enhance the visibility of the operator, individuals, and/or objects, including the bicycle B. A reflectance material 18 may include any desired material, paint, coating, fabric, etc., which phosphors, i.e., emits visible light upon absorbing UV radiation. It should be appreciated that an object may include any desired object or thing, personnel, and/or animal. For example, the object may be in the form of an article of clothing, such as a safety vest or shirt, worn by the individual. Additionally, for example, the object may be in the form of markings on the bicycle B.

By way of example only, the rider of bicycle B is shown wearing an article of clothing with reflectance materials 18, and the UV light 16 interacts with reflectance materials 18 such that reflectance materials 18 convert UV light 16 into visible light 20 to enhance the visibility of the operator.

In FIG. 1, the lighting system 10 is shown to be operating in a dual state for emanating both visible light 14 and non-visible light 16. In FIG. 2, the lighting system 10 is shown to be operating in a visible light state for emanating only visible light 14. The lighting system 10 may be in the form of a handheld or wearable device which may be carried by an individual or used on one or more transportation devices. Thereby, the lighting system 10 may be removably connected to a transportation device. The light source 12 may again have vehicle and non-vehicle applications. The lighting system 10 may have one or more mating features which couple to one or more mating features on the transportation device. For instance, the lighting system 10 may have rail members which interact with channels in a mount affixed to the bicycle B. Additionally and/or alternatively, the lighting system 10 may be removably connected to the transportation device via one or more fasteners, e.g. screws, Velcro®, and etcetera. The lighting system 10 has a selectable emission of UV light 16 and visible light 14. It should be appreciated that the lights may also be directed by one or more light directing devices, e.g. cones.

Figure 3:
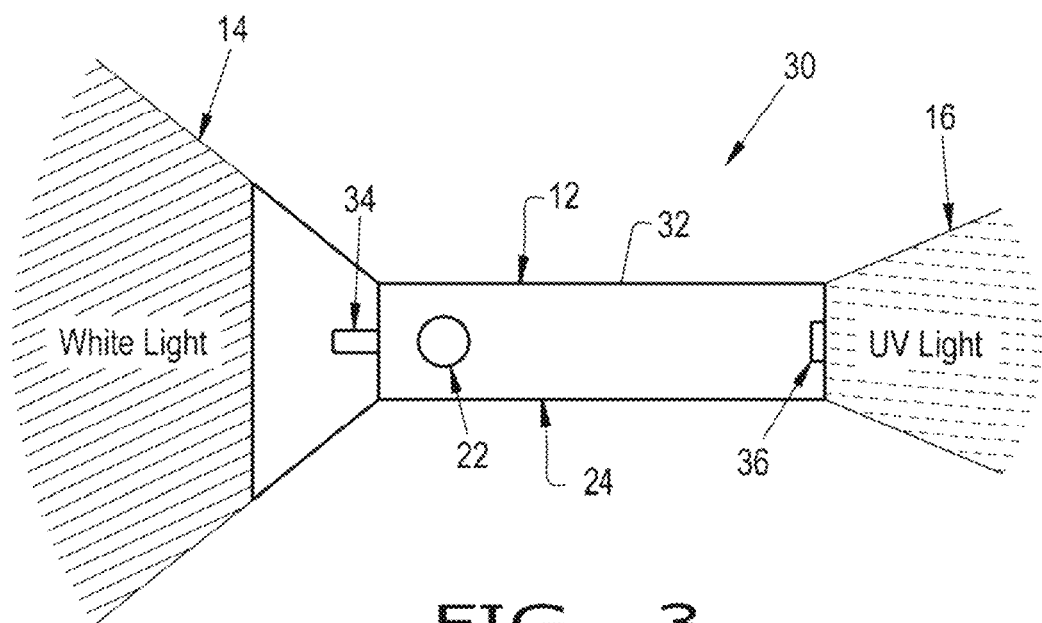
FIG. 3 is a schematic view of another embodiment of a lighting system according to an embodiment of the invention, wherein the lighting system is in the form of a handheld flashlight which can be removably coupled to a transportation device, as described herein.

Now, referring to FIG. 3, there is shown another embodiment of a lighting system 30. In the lighting system 30, the light source 12 is in the form of a handheld flashlight 32. The handheld flashlight 32 includes a body 24 and light(s) 34 and 36, e.g. light emitting diodes (LEDs), which respectively emit the visible light 14 and nonvisible light 16. The handheld flashlight 32 includes a control 22 that selectively turns on/off the visible light 14 and the non-visible light 16. The control 22 may be in the form of a switch or button 22 connected to the body 24.

The flashlight 32 may include one or more LEDs 34 for emitting visible light 14 and one or more LEDs 36 for emitting nonvisible light 16. The LEDs 34 and 36 may be connected to the opposing ends of the body 24. Thus, the lights 14 and 16 may emanate from opposite ends of the body 24 of the light source 12. The ends of the flashlight 32 may have one or more light directing devices, e.g. cones, for directing the visible light 14 and nonvisible light 16. The LED(s) 36 may include a widened spectrum including UV light emitting sources and visual light emitting sources, for example, with a spectrum from 360 nm to 385 nm, for example from 360 nm to 670 nm. The lights 34 and 36 can be connected to the body 24 of the lighting device in any desired fashion. The lights 34 and 36 may be positioned within or on the body 24 of the light source 12 at any desired location. If multiple lights are including in the handheld flashlight 32, the visible lights 34 or the UV lights 36 may be positioned on a common substrate or die. It should be appreciated that lights 14 and 16 may be emitted by any desired light sources.

The handheld flashlight 32 may include one or more mating features and/or fasteners which removably engage with one or more mating features and/or fasteners on the bicycle B. Additionally, the handheld flashlight 32 may not include a designated mating feature and may instead fit within a corresponding mount, e.g. clip, recess, or other receiving member, on the bicycle B.

Figure 4:
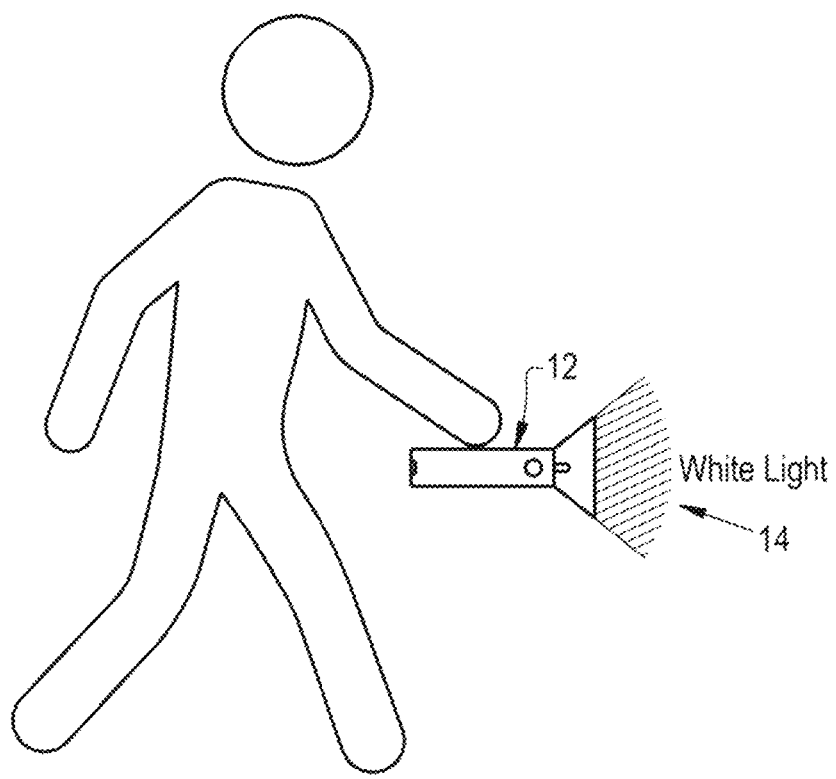
FIG. 4 is a schematic view of the lighting system of FIG. 3, wherein the lighting system is carried by an individual and the lighting system is operating in the visible light state, as described herein.
Figure 5:
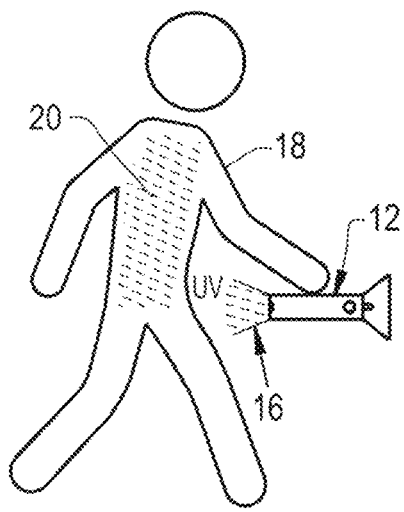
FIG. 5 is a schematic view of the lighting system of FIGS. 3-4, wherein the lighting system is carried by the individual and the lighting system is operating in a nonvisible light state for emanating only nonvisible light, as described herein.
Figure 6:
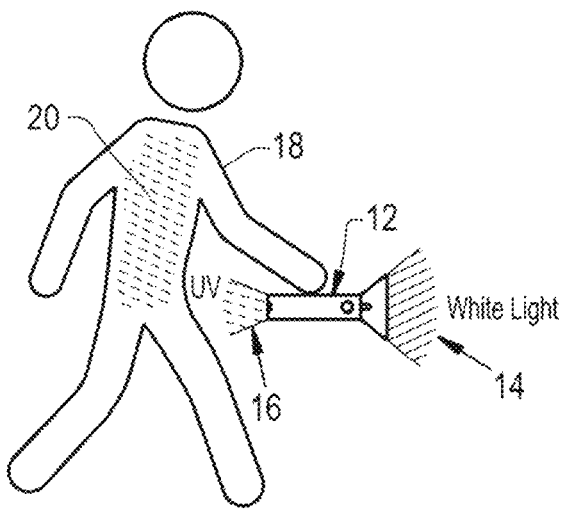
FIG. 6 is a schematic view of the lighting system of FIGS. 3-5, wherein the lighting system is carried by the individual and the lighting system is operating in the dual state, as described herein.

Now, additionally referring to FIGS. 4 through 6, there are shown three different states of the light source 12. In FIG. 4, only visible light 14 is illuminated. In FIG. 5, only nonvisible light 16 is illuminated. A combination of lights 14 and 16 are both shown illuminated in FIG. 6. In FIGS. 5 through 6, UV light 16 is causing the reflectance material 18 to be illuminated causing visible light 20 to emanate from reflectance material 18. It should also be appreciated that the handheld flashlight 32 may be powered by any desired power source. For example, the handheld flashlight 32 may be powered by one or more batteries. Additionally, for example, the handheld flashlight 32 may be selectively connectable to an electric power source of the transportation device.

Figure 7:
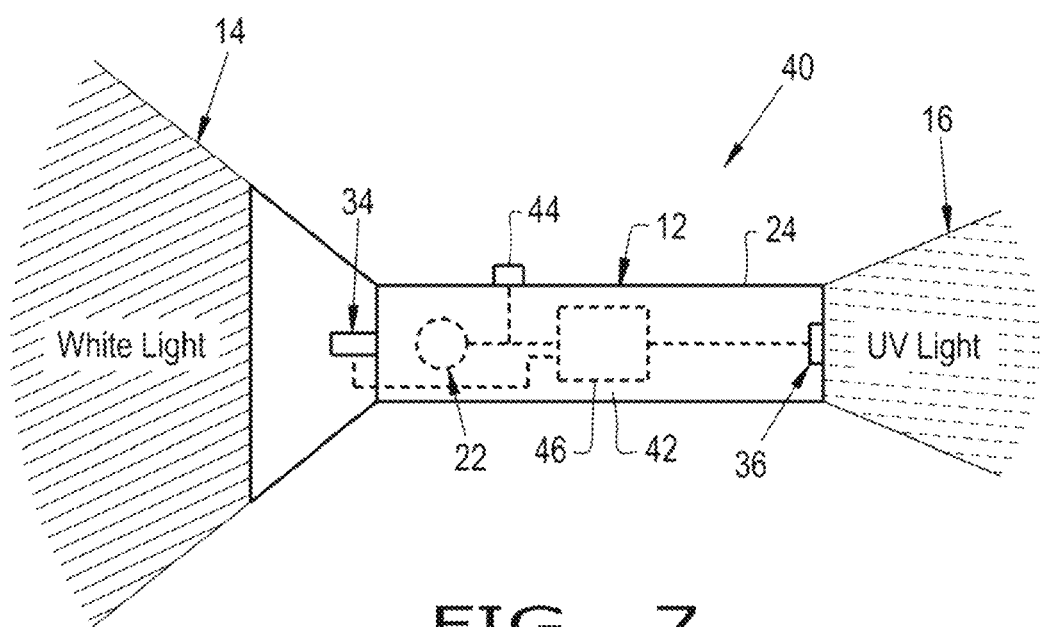
FIG. 7 is a schematic view of a lighting system according to an embodiment of the invention, wherein the lighting system includes a control device for automatically activating the various lighting states of the lighting system, as described herein.

Referring now to FIG. 7, there is shown another embodiment of a lighting system 40. The lighting system 40 may be substantially similar to the lighting system 30, except that the light source 12 is in the form of a flashlight 42 that is automatically controlled. The flashlight 42 can be switched in between its various lighting states via one or more light sensors 44 and a control device 46. The flashlight 42 may or may not include the switch 22 for optional manual control. Each light sensor 44 may be operably connected to the control device 46. Each light sensor 44 may be coupled to the body 24 of the flashlight 42 at any desired location. Each light sensor 44 may be in the form of an optical sensor for sensing ambient light around the individual and/or bicycle B. For example, each light sensor 44 may sense ambient daylight and/or artificial light, such as street lights or headlights of vehicles. Each light sensor 44 may provide a light signal to the control device 46. For instance, each light sensor 44 may send a well-lit signal to the control device 46 upon sensing a sufficient amount of ambient light. As used herein, the term sufficient amount of ambient light may refer to a level of ambient light wherein the reflected visible light 20 from the UV radiation absorbed by the reflectance material 18 is not brighter than the surrounding ambient light.

The control device 46 may be operably connected to the visible and ultraviolet lights 34 and 36, the sensor(s) 44, and/or the switch 22 if included. The control device 46 may be located within the body 24 of the lighting device 42. The control device 46 may be in the form of an analog and/or digital control device, such as a microcontroller. The control device 46 can selectively activate the visible LEDs 34 and/or nonvisible LEDs 36, depending upon the light signal of the light sensor 44.

Figure 8:
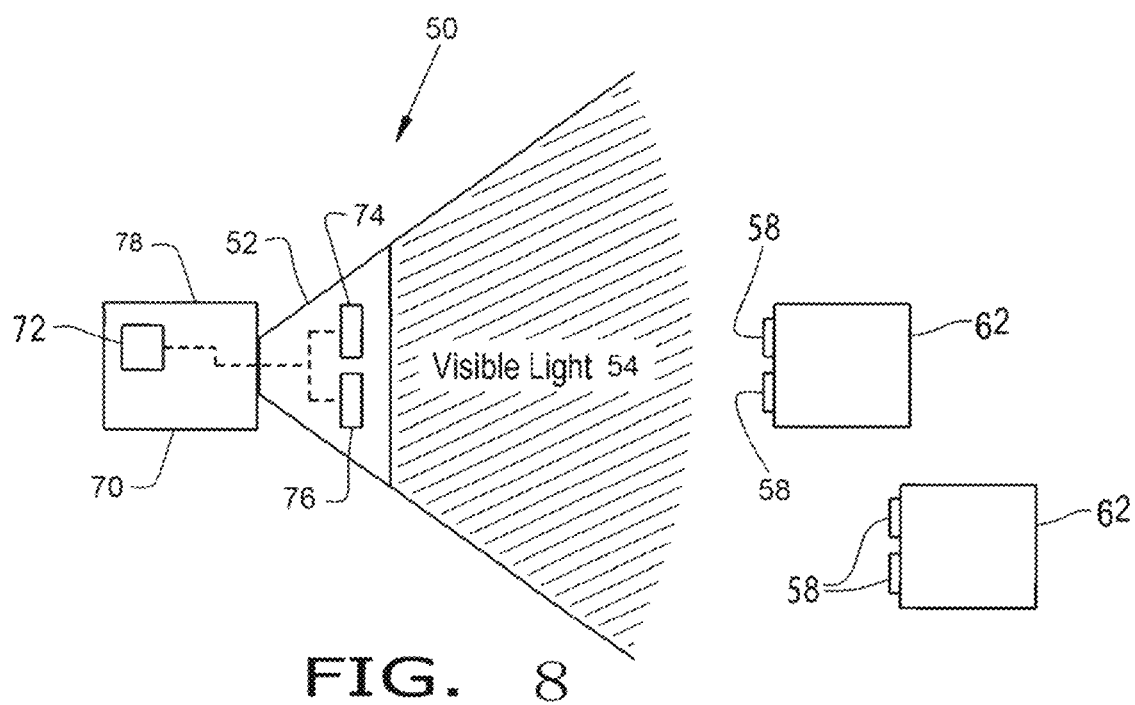
FIG. 8 is a schematic view of a lighting system according to an embodiment of the invention, wherein the lighting system is operating in a first strobing state for emanating visible light, as described herein.
Figure 9:
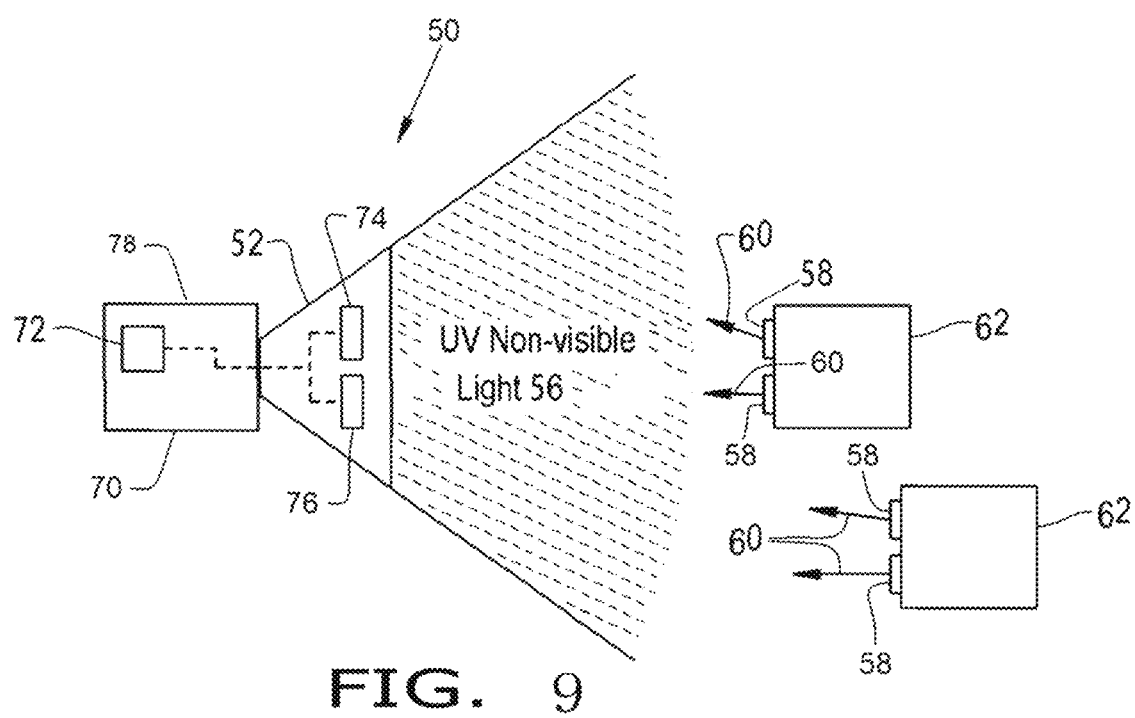
FIG. 9 is a schematic view of the lighting system of FIG. 1, wherein the lighting system is operating in a second strobing state for emanating ultraviolet light, as described herein.

Turning now to FIGS. 8 and 9, there is shown, in a schematic form, another lighting system 50. The lighting system 50 generally includes a lighting device 52 that emits visible light 54 and non-visible light 56. The non-visible light 56 may be in the form of ultraviolet (UV) light 56. When UV light 56 illuminates and interacts with reflectance material 58, the reflectance material will 58 convert UV light 56 into visible light 60 to enhance the visibility of objects 62. A reflectance material 58 may again include any desired material, paint, coating, fabric, etc., which phosphors, i.e., emits visible light upon absorbing UV radiation. An object 62 may include any object or thing, personnel, and/or animal, including, for example, a safety vest of an individual, markings on a roadway or barrier, and a vehicle.

The lighting system 50 may be connected to or used in conjunction with an object 70. For instance, the lighting system 50 may be movably, removably, or fixedly connected to the object 70. The object 70 may be in the form of a safety, service, or work vehicle 70. Alternatively, the object 70 may be in the form of a stationary object, such as a barrier or lighting fixture. As shown, the object 70 is in the form of a vehicle 70 which includes a vehicle control unit (VCU) 72. Therein, the lighting system 50 may help to illuminate the operator or supporting personnel of the vehicle 70.

The lighting device 52 may or may not be operably coupled to the VCU 72 of the vehicle 70. The operation of the lighting device 52 may be controlled by the VCU 72. Alternatively, the lighting device 52 may include its own analog and/or digital control device and accompanying circuitry for controlling the operation thereof independently or in conjunction with the VCU 72. The control device of the lighting device 52 may be in the form of a switch which toggles the on and off conditions of the visible light 54 and UV light 56. The lighting device 52 may include its own power source, e.g. battery, and/or draw power from the vehicle 70 if it is coupled thereto.

The lighting device 52 may additionally include a body 78, e.g. housing, a light directing device, e.g. a lens, shield, reflector, or cone, at least one visible light source 74 for emitting visible light 54, and at least one UV light source 76 for emitting UV light 56. The lighting device 52 may be in the form of a light bar with numerous visible light sources 74 and UV light sources 76. The lighting device 52 may comprise any desired material.

The light sources 74 and 76 may be operably connected to one another. For example, the light sources 74 and 76 may be wirelessly connected to one another or connected to one another via a designated electrical line. It should be appreciated that the light sources 74 and 76 may be operably connected to one another by way of an independent connection to a control device and/or VCU 72 which controls the operation of the light sources 74 and 76. The light sources 74 and 76 may also be operably connected to the control device of the lighting device 52 and/or VCU 72. The light sources 74 and 76 may be in the form of any desired visible light(s) 74 and UV light(s) 76, respectively. For example, the lights 74 and 76 can in the form of light emitting diodes (LEDs). The LEDs may include a widened spectrum including UV light emitting sources and visual light emitting sources, for example, with a spectrum from 360 nm to 670 nm.

The lights 74 and 76 are connected to the body 78 of the lighting device 52. The lights 74 and 76 may be positioned within or on the body 78 of the lighting device 52 at any desired location. The lights 74 and 76 can be positioned on a common substrate or the same die. For example, the lights 74 and 76 can be arranged in a multi-die LED chip configuration with a single UV emitter in the middle and surrounded with adjacent visible light emitters. The light emanating from the lights 74 and 76 may be directed by the light directing device.

Lighting system 50 will light up or activate any reactive items having reflectance material 58, for example safety vests, during this off mode of visible light 54 such that any items having reflectance material 58 which are not presently illuminated by visible light 54 from the visible light(s) 74 will be illuminated by the UV light 56 from the UV light(s) 76. The lighting system 50 may operate in multiple states. For example, the lighting system 50 can operate in a single steady on state, a dual steady on state, and/or a strobing or flashing state. During the single steady on condition, the visible light(s) 24 of the lighting device 52 acts as a solid (continuous) light in the desired visible spectrum chosen. During the dual steady on condition, both of the lights 74 and 76 act as continuous lights for emanating visible light 54 and non-visible light 56. As soon as lighting device 52 is placed in a strobing or flashing state, during the "off" stage of visible light 54, UV light 56, outside of the visible range, is strobed "on" by the at least one UV light 76. Advantageously, this allows the introduction of a positive safety mode during a normal off stage of visible light 54. Additionally, advantageously, the energy of the system is conserved. Furthermore, the operational life of the UV light(s) 76 is prolonged.

The UV light(s) 76 may emanate UV light 56 in a wavelength range from 360 nm to 385 nm. For example, the UV light 56 can be emitted at a 365 nm wavelength. At the 365 nm wavelength, the lighting system 50 will not interfere with other lighting systems of other service vehicles or personnel. For instance, some service vehicles may include lighting systems that emit a blue light, and the UV light 56 will not interfere or be confused with such a wavelength of the lighting system 50. Alternately, as noted previously, embodiments of the present lighting system may effectively utilize light further extending into the range of 385 nm to 445 nm, for non-limiting example from 315 nm to 400 nm, or may even utilize light within the range of 385 nm to 445 nm exclusively.

Figure 10:
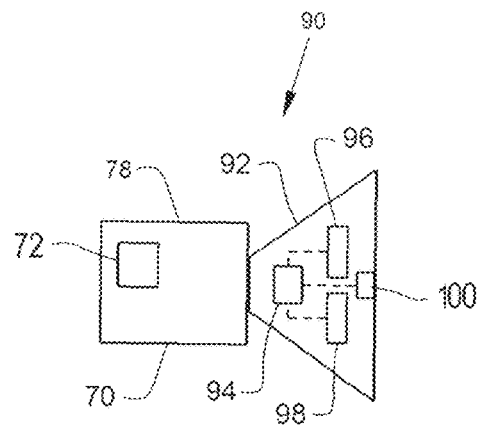
FIG. 10 is a schematic view of a lighting system according to another embodiment of the invention, as described herein.

Referring now to FIG. 10, there is shown another embodiment of a lighting system 90. The lighting system 90 may be substantially similar to the lighting system 50 as described above, except that the lighting device 92 includes a control device 94 and at least one light sensor 100 in addition to the one or more visible light source(s) 96 and ultraviolet light source(s) 98, i.e.—light(s) 96 and 98. The control device 94 may be operably connected to the visible light source(s) 96 and ultraviolet light source(s) 98, the light sensor(s) 100, and/or the VCU 72. The control device 94 may be located within the body 78 of the lighting device 92. The control device 94 may be in the form of a switch, e.g. a relay switch, or a microcontroller. The control device 94 may be an analog and/or digital control device.

Each light sensor 100 may be operably connected to the control device 94. Each light sensor 100 may be in the form of an optical sensor for sensing ambient light around the object 72. For example, each light sensor 100 may sense ambient daylight and/or artificial light, e.g. street lights, lights of other service vehicles, etc. Each light sensor 100 may provide a light signal to the control device 94. For instance, each light sensor 100 may send a well-lit signal to the control device 94 upon sensing a sufficient amount of ambient light. As used herein, the term sufficient amount of ambient light may refer to a level of ambient light wherein the reflected light 20 from the UV radiation absorbed by the reflectance material 18 is not brighter than the surrounding ambient light. In such a condition wherein there is sufficient ambient light, the control device 94 may continue to strobe the visible light source(s) 96 while maintaining the UV light source(s) 98 in an off state.

The control device 94 may be configured for selectively activating and/or directing UV light source(s) 98 at a particular area or location relative to the object 70 and/or all around the object 70. For example, the light sensor(s) 100 may identify one or more areas or locations, adjacent to the object 70, which may have less ambient light than another surrounding area. Thereafter, the control device 94 may direct the UV light specifically to this particular, relatively low-lit area. Thus, the control device 94 may optimize the effectiveness of the UV light source(s) 98 by radiating specific areas which may subject the object 70 and/or personnel to a more dangerous situation relative to surrounding relatively more well-lit areas.

Figure 11:
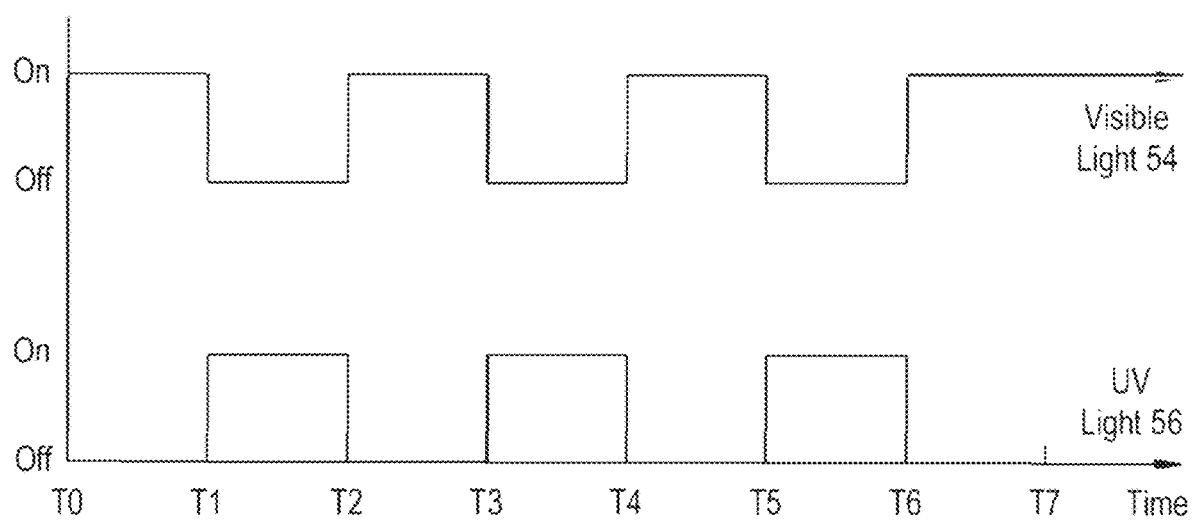
FIG. 11 is a diagram illustrating the timing of the first and second strobing states, as described herein.

Now, additionally referring to FIG. 11, there is shown, in a schematical form, a simplified timing diagram of the lighting systems 50 and 90. As can be seen when visible light 54 is on, UV light 56 is off. At time T0 lighting device 52 is emitting visible light 54. At times T1, T3, and T5 visible light 54 is turned off and UV light 56 is turned on. In a contra sense, at times T2, T4 and T6 UV light 56 is turned off and visible light 54 is turned on. The timing and durations of these events can vary such that UV light 56 may be on for only a portion of the time visible light 54 is off. Further, it is also contemplated that UV light 56 may strobe multiple times during an off time of the visible light 54.

At time T7 visible light 54 remains constantly on and UV light 56 remains off, as lighting device 52 transitions to an on state, by either automatic selection or by the selection of an operator of lighting system 50 and/or 90. While not illustrated, when an operator selects an off state, both lights 54 and 56 are off. It should be appreciated that an operator of the lighting system 50 and/or 90 may control the operation of the lighting device 52 and/or 92, and/or the control device 94 and/or VCU 72 may control the operation of the lighting device 52 and/or 92.

Advantageously, the invention uses the off portion of a strobing visible light 54 to strobe UV light 56 on to enhance the visibility of the object 62. The invention can enhance the output of a lighting system in that the UV light 56 is only on during the time at which visible light 54 is off to thereby reduce power consumption rather than leaving a UV light on all of the time. Further, the light emitters, during the strobing phase (times T0-T6) are on only a portion of time, so that more light output may be possible during the on portions, with the light elements having a brief off, cooling state.

Figure 12:
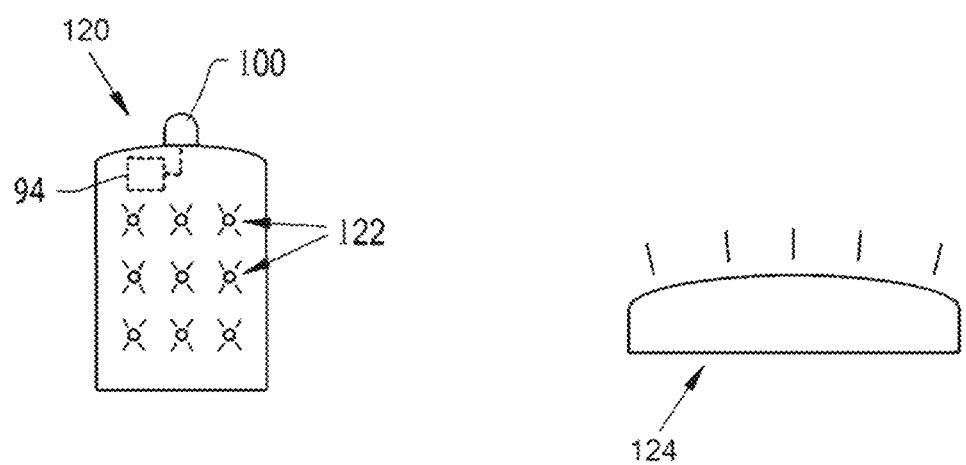
FIG. 12 is a schematic view of a lighting system according to another embodiment of the invention, as described herein.

Referring now to FIG. 12, there is shown another embodiment of a lighting system 120. The lighting system 120 may include one or more visible and/or non-visible light source(s) 122, with one or more light sensors 100, which operate in tandem with one or more visible and/or non-visible light source(s) 124. For instance, the lighting system 120 may be similar to the lighting system 50 or the lighting system 90, except that the lighting system 120 does not include an additional visible light source 74 or 96. Hence, the lighting system 120 may be in the form of a stand-alone UV lighting system 120 which includes at least one non-visible light source 122 for emitting non-visible, e.g. UV, light.

The lighting system 120 may cooperate with one or more existing or additional visible light sources 124. The one or more existing visible light sources 124 may be in the form of ambient light, visible lights on the vehicle 70, and/or visible lights on another object. Advantageously, the lighting system 120 may eliminate the need for rewiring the electronics of the vehicle 70 because the lighting system 120 may operate in tandem with one or more existing flashers or strobes on the vehicle 70. It should be appreciated that the visible light source(s) 124 may or may not be coupled to the UV light source(s) 122.

Whether by actively sensing visible light and/or passively awaiting a signal from visible light source(s) 124, the lighting system 120 may turn the UV light source(s) 122 on or off depending upon the existing light source(s) 124. For instance, the lighting system 120 may include a control device 94 and at least one light sensor 100, as discussed above. Thereby, the lighting system 120 may sense visible light via the light sensor 100. Then, the control device 94 may accordingly time the UV light source(s) 122 to turn on when the light sensor 100 detects that the existing visible light 124 is turned off or when there is an insufficient amount of visible light. Additionally or alternatively, the lighting system 120 may turn the UV light source(s) 122 on or off upon receiving a signal from the existing visible light source 124, e.g. a strobe light. For instance, the existing visible light source 124 may emit a low-level electronic signal that tells the lighting system 120 when the visible light from the light source 124 is off or on. Hence, the visible light source 124 may electronically listen for the signal of the existing visible light source 124 and thereafter coordinate and time the firing of the UV light source(s) 122. Thereby, the UV light source 122 may be strobed in dependence upon the signal from the existing visible light source 124.

It should be appreciated that the lighting system 120 may be coupled to and powered by the vehicle 70. Additionally or alternatively, the lighting system 120 may be powered by its own power source, e.g. battery. It should also be appreciated that the that the lighting system 120 may also be configured for sensing or being signaled by an existing UV light source in order to alter the operation of the UV light source(s) 122. It should further be appreciated that the lighting system 120 may operate in a strobing state or a constant on state. In the strobing state, the UV light source 122 may be turned on and off in dependence upon an on or off state of the existing visible light source 124. In the constant on state, the UV light source 122 may remain on at all times unless an existing light source is sufficiently illuminating the surrounding area or object(s).

According to another aspect of the invention, the lighting system 120 may be configured as a monitoring system 120 which utilizes one or more visible lights 122, with one or more light sensors 100, which operate in tandem with one or more "smart" and/or "dumb" UV lights 124. Thereby, the lighting system 120 may include visible light source(s) 122, with one or more light sensors 100 attached thereto, and UV light(s) 124.

The monitoring system 120 may detect whether the surrounding area and/or objects are illuminated with light, and if not, the system may hit the area and/or objects with UV light. The monitoring system 120 may time the UV light source(s) 122 such that when other visible light and/or non-visible light strobes 124 are off, it fires the UV light into a respective zone. For example, if a truck has four amber strobes and they all fire at the same time they are leaving a hole of blackness during the off phase. In the dark phase or blackness, the system may fire the area with UV light. The control device 94 and/or the amber strobes may include software, e.g. algorithms, which alters the strobe moment forward or backward in time towards dark times or blackness such that the strobes can fill the black moments. Hence, the strobes on a truck could independently but intelligently adjust their firing in real time. A person looking at the flashing vehicle may not be affected by the strobes being in sync and/or out of sync. Thus, persons working around the truck do not work in dark zones because the whole truck is lit 100% of the time and all therearound. If the UV and visible light timing is mixed, then the smart strobe could monitor the zone and adjust the visible strobe and fire the UV light source as appropriate.

Figure 13:
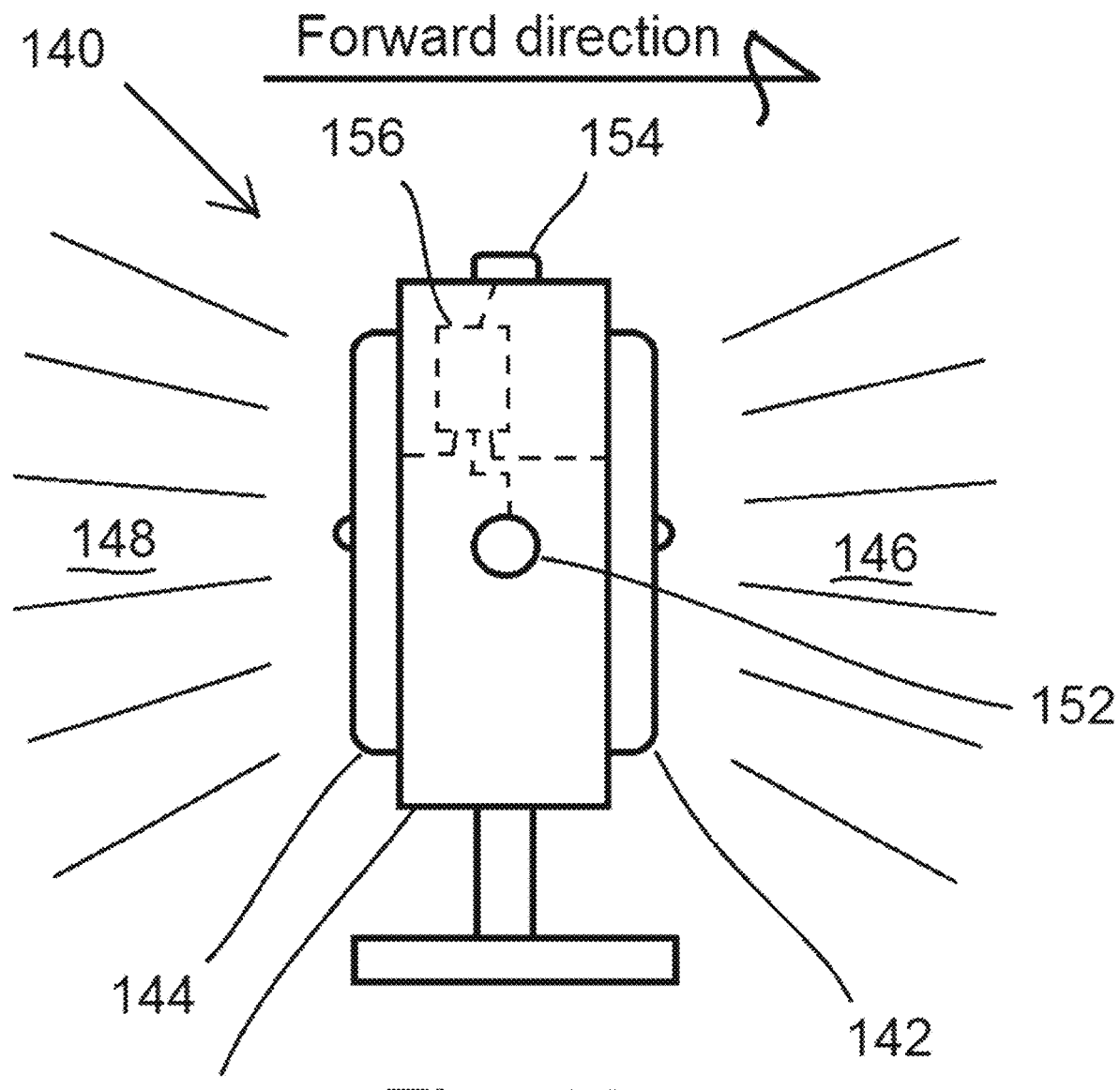
FIG. 13 is a schematic view of a lighting system according to another embodiment of the invention, wherein the lighting system includes a control device for automatically activating the various lighting states of the lighting system, as described herein.

Referring now to FIG. 13, there is shown another embodiment of a lighting system 140. The lighting system 140 may be substantially similar to the lighting systems 10, 30, 40, 50, 90, and/or 12, except that the body 150 is arranged so that visible light 146 is projected in a forward direction relative to the vehicle (not shown) to which it is attached, and so that non-visible or UV light 148 is projected in a rearward direction relative to the vehicle to which it is attached. The lighting system 140 may be automatically controlled, so that it can be switched in between its various lighting states via one or more light sensors 154. The lighting system 140 may or may not include a control switch or button 152 for optional manual control.

Each of the light sensor(s) 154, the control switch or button 152, a forward facing visible light source 142, and a rearward facing non-visible or UV light source 144 may be connected to a control device 156. The light sensor(s) 154 may be in the form of an optical sensor for sensing ambient light around the lighting system 140. As with previous embodiments, the light sensor(s) 154 may sense ambient daylight and/or artificial light, such as street lights or lights of vehicles. The light sensor 154 may again provide a light signal to the control device 156 indicating whether a sufficient amount of ambient light has been detected. Once again, the term sufficient amount of ambient light may refer to a level of ambient light wherein reflected visible light 20 from the UV radiation absorbed by any reflectance material 18 is not brighter than the surrounding ambient light. Reflectance material 58 may again include any desired material, paint, coating, fabric, etc., which emits visible light upon absorbing UV radiation, which may then illuminate any object or thing, personnel, and/or animal, including, for example, a safety vest of an individual, markings on a roadway or barrier, and a vehicle.

The control device 156 may again be in the form of an analog and/or digital control device, such as a microcontroller. The control device 156 can selectively activate the forward facing visible light source 142 and/or rearward facing non-visible or UV light source 144, depending upon the light signal of the light sensor 154. Alternately, the lighting system 140 may or may not be operably connected to the VCU of a vehicle (not shown), so that operation of the forward facing visible light source 142 and/or rearward facing non-visible or UV light source 144 is controlled by the VCU. The lighting system 140 may again include its own power source, e.g. battery, and/or draw power from the vehicle to which it is attached. The forward facing visible light source 142 and/or rearward facing non-visible or UV light source 144 may again be in the form of any desired visible light(s) 142 and UV light(s) 144, respectively. For example, the forward facing visible light source 142 and/or rearward facing non-visible or UV light source 144 may be in the form of light emitting diodes (LEDs). The LEDs may again include a widened spectrum including UV light emitting sources and visual light emitting sources, for example, with a spectrum from 360 nm to 670 nm.

As with previous embodiments, the lighting system 140 may operate in multiple states. For example, the lighting system 140 can operate in a single steady on state, a dual steady on state, and/or a strobing or flashing state. During the single steady on condition, the forward facing visible light source(s) 142 acts as a solid (continuous) light in the desired visible spectrum chosen. During the dual steady on condition, both of the forward facing visible light source(s) 142 and the rearward facing non-visible or UV light source(s) 144 act as continuous lights for emanating visible light 146 in a forward direction and non-visible light or UV light 148 in a rearward direction.

When the lighting system 140 is placed in a strobing or flashing state, during the "off" stage of the forward facing visible light source(s) 142, the rearward facing non-visible or UV light source(s) 144 is strobed "on" by the control device 156. The timing and durations of these events can vary such that the rearward facing non-visible or UV light source(s) 144 may be on for only a portion of the time that the forward facing visible light source(s) 142 is off. Further, it is also contemplated that the rearward facing non-visible or UV light source(s) 144 may strobe multiple times during an off time of the forward facing visible light source(s) 142. This has the desired effect of causing the appearance of objects located rearward of the lighting system 140 to profoundly stand out visually to oncoming observers.

Figure 14:
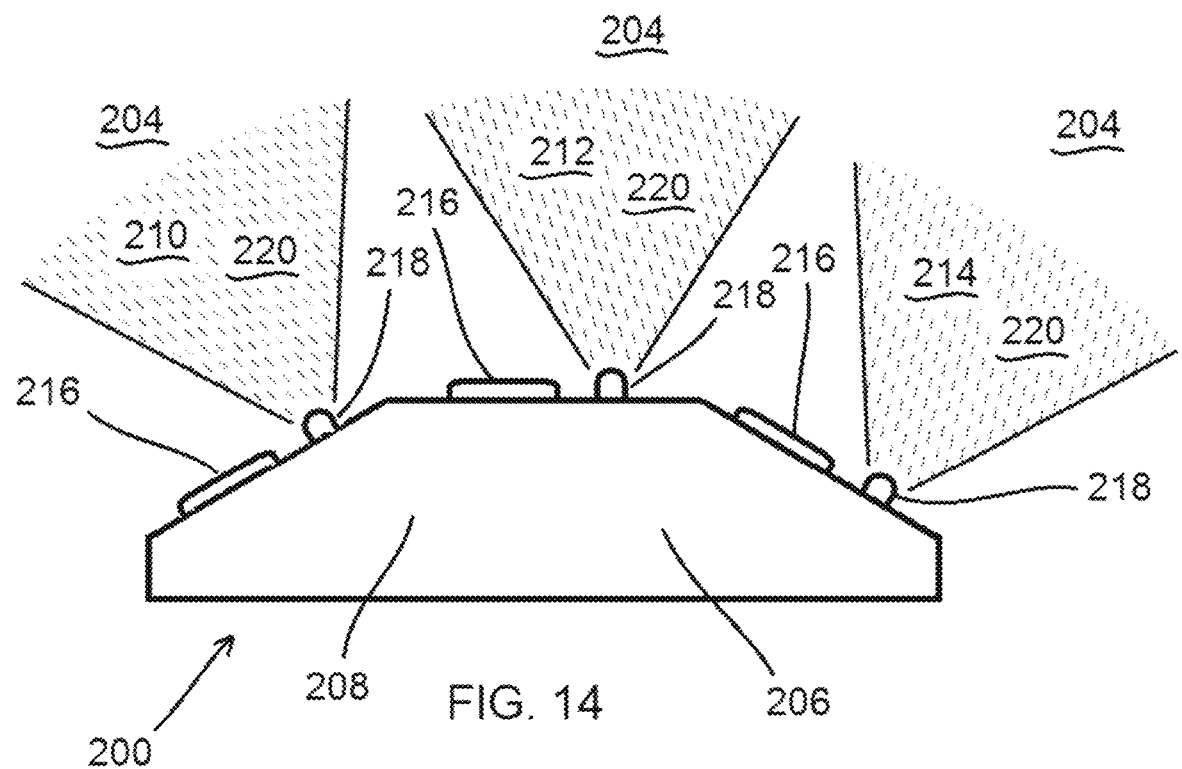
FIG. 14 is a top view of a lighting system according to another embodiment of the invention, as described herein.

Turning now to FIG. 14, another embodiment of a lighting system 200 according to the invention is shown. In the embodiment of the lighting system 200 shown in FIG. 14, the lighting system 200 includes a lighting device 206 that is arranged to monitor for non-limiting example three zones, zone 1 designated 210, zone 2 designated 212, and zone 3 designated 214. In order to monitor the three zones 210, 212, and 214, the lighting device 206 is provided with light, motion, heat, and/or people sensors 216 for each of the three zones 210, 212, and 214, attached to the body 208 of the lighting device 206. The light, motion, heat, and/or people sensors 216 may each be connected to a control device (not shown) located within the body 208 of the lighting device 206, or located elsewhere. The control device utilizes the light, motion, heat, and/or people sensors 216 to determine whether each of the three zones 210, 212, and 214 is a poorly illuminated area 204 and/or whether personnel are located within each of the three zones 210, 212, and 214. If the control device determines that any of the three zones 210, 212, and 214 is a poorly illuminated area 204 and/or that any of the three zones 210, 212, and 214 is occupied by personnel, then the control device causes a non-visible/UV light source 218 associated with that zone to flood the poorly illuminated area 204 of that zone with UV light 220. In this way, the lighting system 200 targets dangerous dark areas and energize safety vests worn by personnel in those poorly illuminated areas 204, thereby making those personnel stand out in strong contrast for safety.

The control device of the lighting system 200 using the light, motion, heat, and/or people sensors 216 may determine whether each of the three zones 210, 212, and 214 is a steadily poorly illuminated area 204, and/or may determine whether each of the three zones 210, 212, and 214 is an intermittently poorly illuminated area 204. In this way, the lighting system 200 may be used in conjunction with existing emergency visible lighting and flashing visible light systems by way of sensing visible illumination of each individual area or zone 210, 212, and 214 provided by such existing emergency visible lighting and flashing visible light systems. Moreover, the control device of the lighting system 200 may time and adjust the illumination of each individual area or zone 210, 212, and 214 in ultraviolet light, in order to synchronize the illumination of each individual area or zone 210, 212, and 214 in ultraviolet light with the intermittent absence of visible light illumination in each individual area or zone 210, 212, and 214 from existing emergency visible lighting and flashing visible light systems. It is noted that, although the lighting system 200 in FIG. 14 is shown having three zones 210, 212, and 214, it is contemplated that the lighting system 200 of the present invention may be provided with more or less zones, each having separate light, motion, heat, and/or people sensors 216 and/or non-visible/UV light sources 218.

Figures 15, 16:
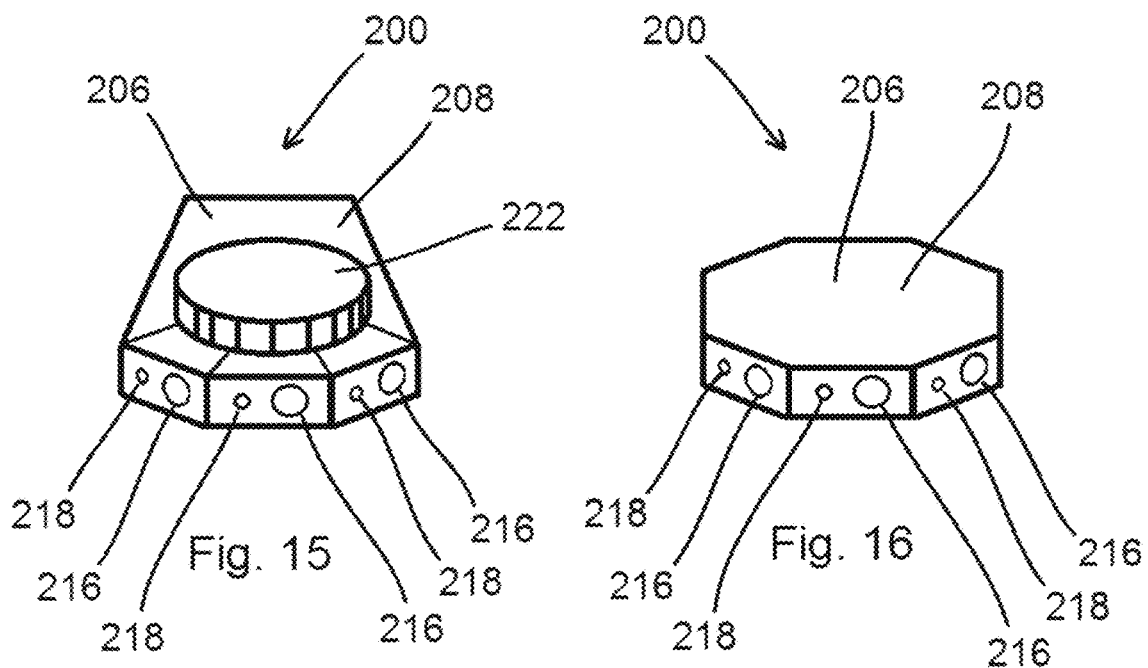
FIG. 15 is a top front perspective view of a lighting system according to another embodiment of the invention, as described herein.
FIG. 16 is a top front perspective view of a lighting system according to another embodiment of the invention, as described herein.

FIGS. 15 and 16 show embodiments of the lighting system 200, similar to the embodiment of the lighting system 200 of FIG. 14. Each of the embodiments of the lighting system 200 shown in FIGS. 15 and 16 are provided with a lighting device 206 having a body 208. In the embodiment of the lighting system 200 shown in FIG. 15, three sets of light, motion, heat, and/or people sensors 216 and three sets of non-visible/UV light sources 218 are again provided. Additionally, a camera 222 is provided, which is connected to and used by the control device of the lighting system 200 to look for movement, people, or light in each of the zones. Although the embodiment of the lighting system 200 shown in FIG. 15 has both light, motion, heat, and/or people sensors 216 and non-visible/UV light sources 218, and the camera 222, it is contemplated that the lighting system 200 may be exclusively provided with the camera 222 in lieu of the light, motion, heat, and/or people sensors 216, in order to determine whether each of the zones is a poorly illuminated area and/or whether personnel are located within each of the zones.

As before, if the control device determines that any of the zones is a poorly illuminated area and/or that any of the zones is occupied by personnel, then the control device causes the non-visible/UV light source 218 associated with that zone to flood the poorly illuminated area of that zone with UV light. In this way, the lighting system 200 targets dangerous dark areas and energize safety vests worn by personnel in those poorly illuminated areas 204, thereby making those personnel stand out in strong contrast for safety. Also as before, the control device of the lighting system 200 using the light, motion, heat, and/or people sensors 216 and/or the camera 222 may determine whether each of the zones is a steadily poorly illuminated area, and/or may determine whether each of the zones is an intermittently poorly illuminated area. In this way, the lighting system 200 may again be used in conjunction with existing emergency visible lighting and flashing visible light systems by way of sensing visible illumination of each individual area or zone provided by such existing emergency visible lighting and flashing visible light systems. Moreover, the control device of the lighting system 200 may again time and adjust the illumination of each individual area or zone in ultraviolet light, in order to synchronize the illumination of each individual area or zone in ultraviolet light with the intermittent absence of visible light illumination in each individual area or zone from existing emergency visible lighting and flashing visible light systems.

FIG. 16 shows another embodiment of the lighting system 200, including a lighting device 206 that is arranged to monitor for non-limiting example eight zones. Each of the eight zones is provided with light, motion, heat, and/or people sensors 216 and non-visible/UV light sources 218 attached to the body 208 of the lighting device 206, and connected to a control device (not shown). The embodiment of the lighting system 200 functions substantially similar to the embodiment of the lighting system 200 shown in FIG. 14, except that a full 360 degrees of coverage is accomplished in determining using the light, motion, heat, and/or people sensors 216 whether each of the eight zones is a poorly illuminated area and/or whether personnel are located within each of the eight zones, and in the control device causing the non-visible/UV light source 218 associated with that zone to flood the poorly illuminated area of that zone with UV light. In this way, the lighting system 200 shown in FIG. 16 again targets dangerous dark areas and energizes safety vests worn by personnel in those poorly illuminated areas, thereby making those personnel stand out in strong contrast for safety anywhere within the full 360 degrees. It is noted that the 360 degrees around the lighting system 200 shown in FIG. 16 are divided into eight zones. However, it is contemplated that the 360 degrees around the lighting system 200 may be divided into more or less zones.

Figure 17:
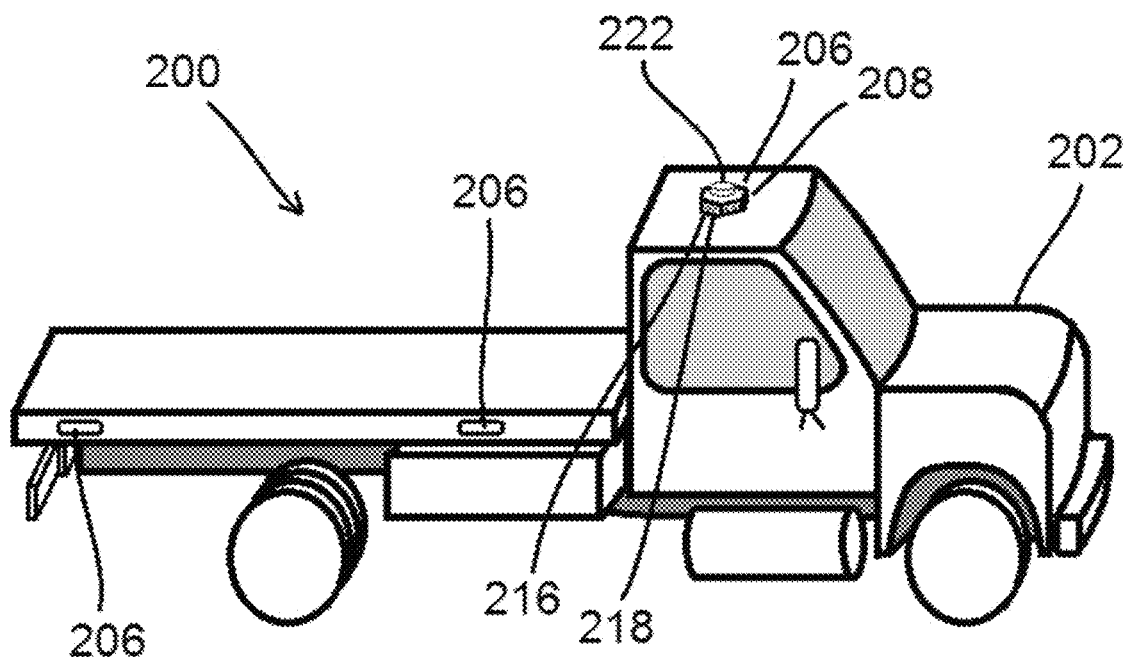
FIGS. 17 and 18 are perspective views of vehicles including lighting systems according to further embodiments of the invention, as described herein.
Figure 18:
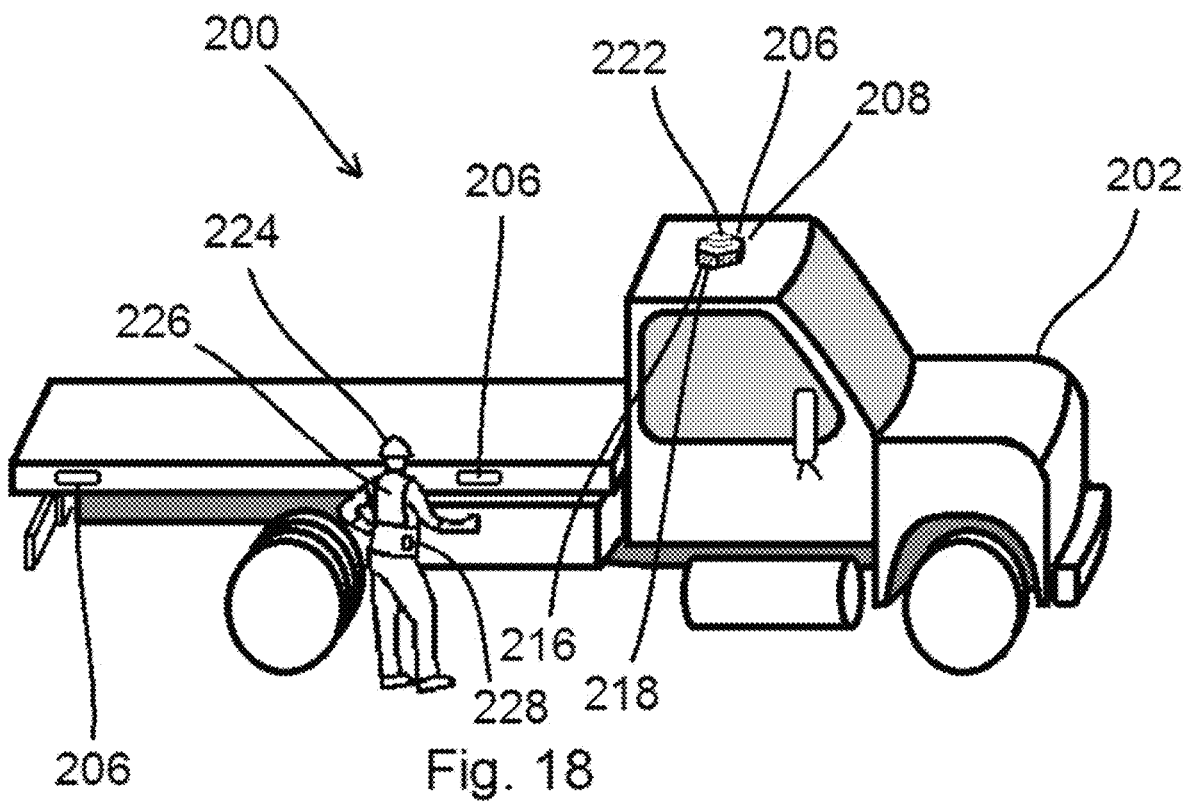

Turning now to FIGS. 17 and 18, embodiments of the lighting system 200 are shown that include vehicles or other transportation devices 202. Each of the embodiments of the lighting system 200 again includes one or more lighting devices 206 having a body 208 and/or integrated with vehicle marker lamps or otherwise attached to the vehicle or other transportation device 202. The lighting devices 206 are again arranged to monitor several zones using light, motion, heat, and/or people sensors 216 and/or cameras 222 for each of the zones. The light, motion, heat, and/or people sensors 216 and/or cameras 222 are again connected to a control device (not shown) in each lighting system 200. The control device of each lighting system 200 again utilizes the light, motion, heat, and/or people sensors 216 and/or cameras 222 to determine whether each of the zones is a poorly illuminated area and/or whether personnel 224 are located within each of the zones. If the control device of each lighting system 200 determines that any of the zones is a poorly illuminated area and/or that any of the zones is occupied by personnel 224, then the control device causes a non-visible/UV light source 218 associated with that zone and/or integrated with vehicle marker lamps or otherwise attached to the vehicle or other transportation device 202 to flood the poorly illuminated area of that zone with UV light. In this way, the lighting systems 200 of each of FIGS. 17 and 18 again target dangerous dark areas and energize safety reflectance apparel 226 worn by personnel 224 in those poorly illuminated areas 204, thereby making those personnel 224 stand out in strong contrast for safety.

In the case of the embodiment of the lighting system 200 shown in FIG. 18, a wireless device 228 carried by personnel 224 may communicate with the lighting system 200, in order to provide proximity and/or location information of the personnel 224 to the lighting system 200. In this way, the lighting system 200 may synchronize the illumination of a given individual area or zone in ultraviolet light with the continuous or intermittent absence of visible light illumination in the given individual area or zone from existing emergency visible lighting and flashing visible light systems only when at least one personnel 224 is present in that individual area or zone.

The lighting systems 200 shown in FIGS. 17 and 18 may again be implemented having their own visible lights, such as amber lights, or may not be provided with their own visible lights, and instead be used in conjunction with existing emergency visible lighting and flashing visible light systems located on the vehicles or other transportation devices 202. Whether or not the lighting systems 200 are provided with their own visible lights, the lighting systems 200 may be used in conjunction with existing emergency visible lighting and flashing visible light systems by way of sensing visible illumination of each individual area or zone provided by such existing emergency visible lighting and flashing visible light systems. The lighting systems 200 may again sense visible illumination of each individual area or zone provided by such existing emergency visible lighting and flashing visible light systems using their own light sensors 216 and/or cameras 222. Alternatively, the lighting systems 200 may determine visible illumination of each individual area or zone provided by such existing emergency visible lighting and flashing visible light systems by way of wired or wireless connections (not shown) with such existing emergency visible lighting and flashing visible light systems. The control devices of the lighting systems 200, using the lighting systems' one or more optical sensors or visible light sensors 216 and/or cameras 222, and/or wired or wireless connections, may again time and adjust the illumination of each individual area or zone in ultraviolet light, in order to synchronize the illumination of each individual area or zone in ultraviolet light with the intermittent absence of visible light illumination in each individual area or zone from existing emergency visible lighting and flashing visible light systems.

Figure 19:
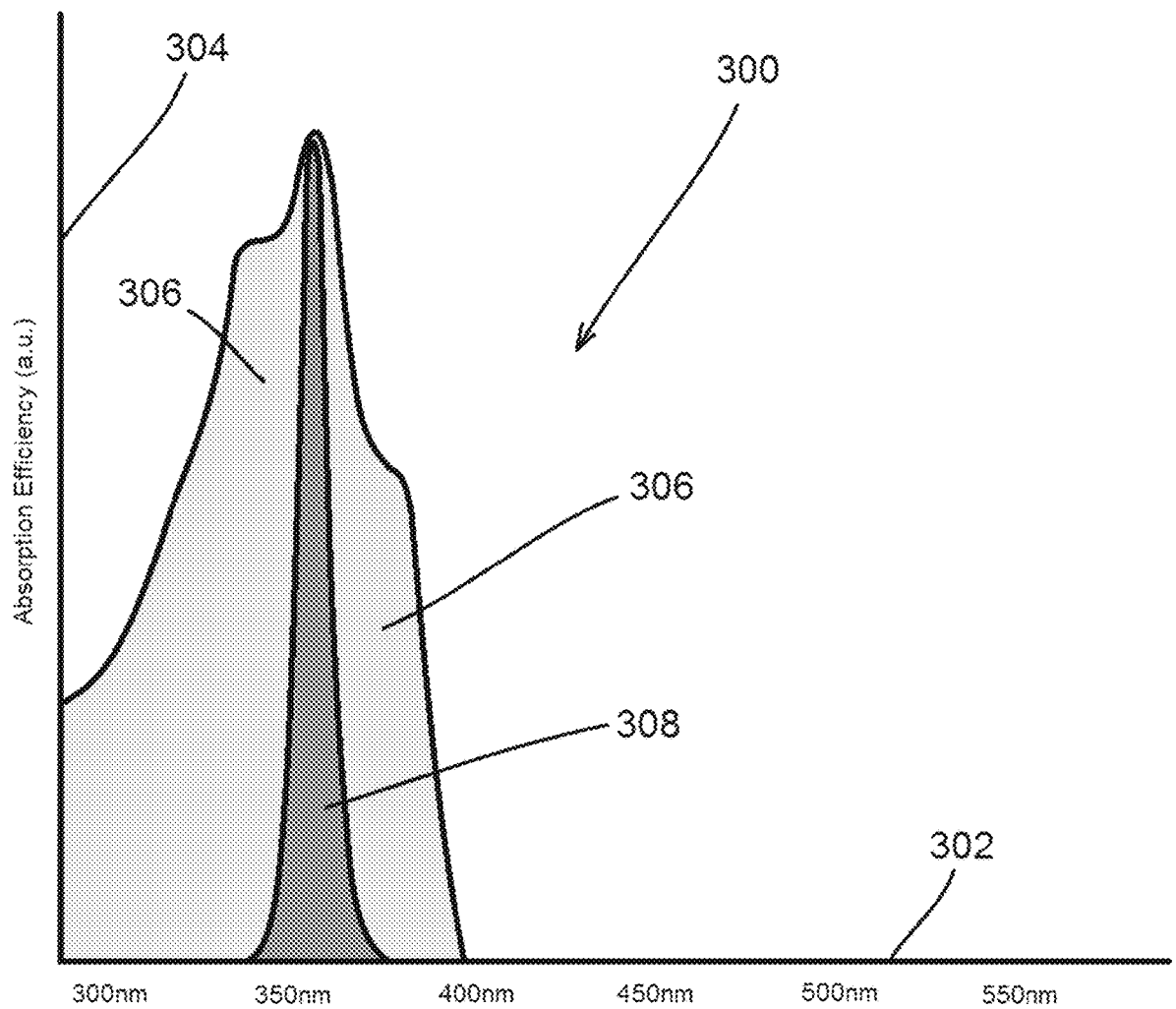
FIGS. 19 and 20 are charts of absorption spectra of common fluorescence materials, as described herein.
Figure 20:
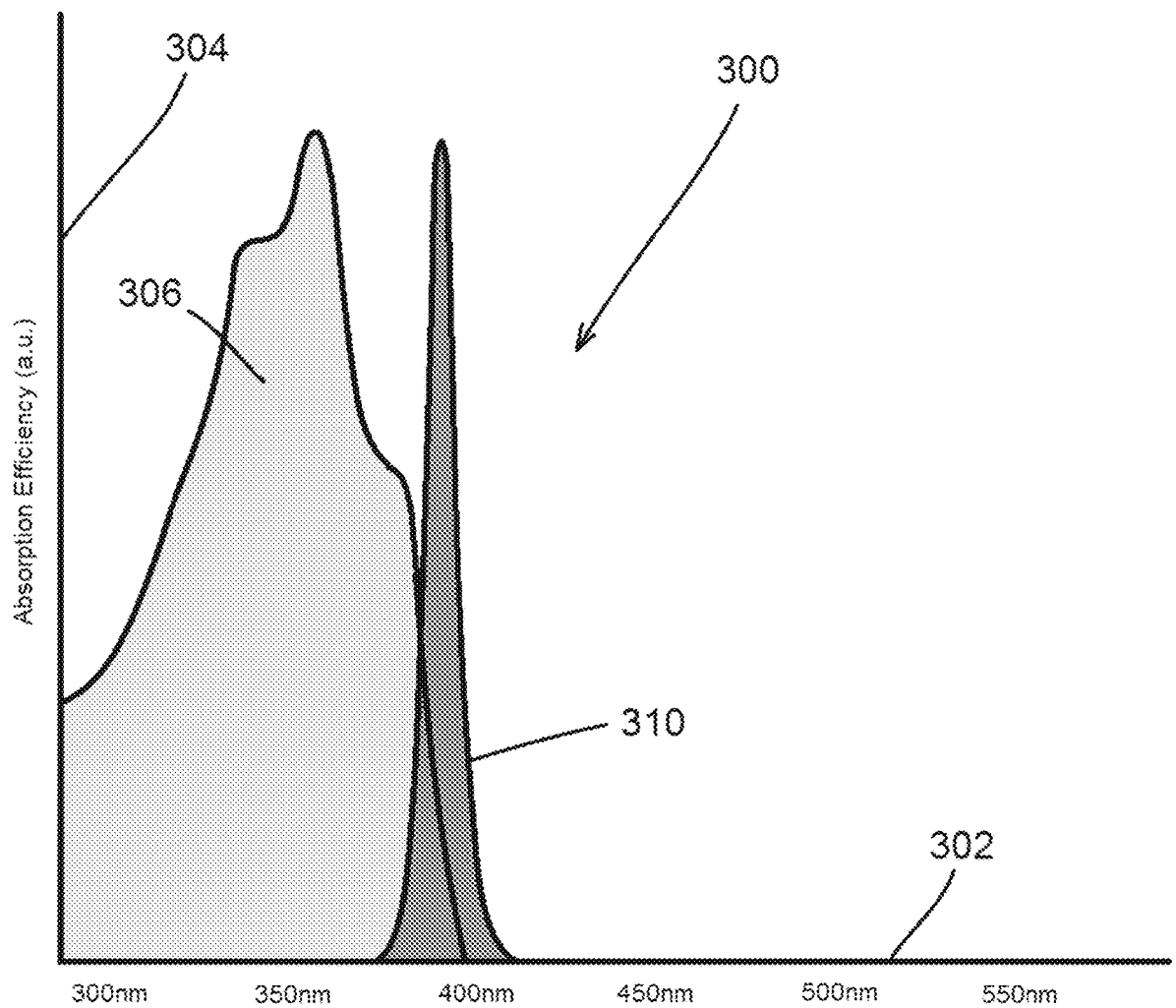

As noted in the summary section above, embodiments of the present lighting system may effectively utilize light further extending into the range of 385 nm to 445 nm, for non-limiting example from 315 nm to 400 nm, or may even utilize light within the range of 385 nm to 445 nm exclusively. For example, FIGS. 19 and 20 show graphs of absorption efficiency versus wavelength 300 having a frequency axis 302 and an absorption efficiency axis 304. The graphs of absorption efficiency versus wavelength 300 show absorption spectra of a common fluorescence material 306, i.e.—the spectra of wavelengths over which that particular common fluorescence material will fluoresce. FIG. 19 also shows the Gaussian distribution of wavelengths of a 365 nm UV LED 308, which in this example is positioned to correspond with the greatest fluorescence of the material. FIG. 20, on the other hand, shows the Gaussian distribution of wavelengths of a 385 nm UV LED 310, which overlaps at least a portion of the spectra of wavelengths over which that particular common fluorescence material will fluoresce. Therefore, it is contemplated within the scope of the present lighting system that LED lights may be used that extend into the range of 385 nm to 445 nm, for non-limiting example from 315 nm to 400 nm, or even light within the range of 385 nm to 445 nm exclusively, while still providing secondary or additional light which radiates from a reflectance material of an object, while avoiding the aforementioned detrimental effects to persons and to the plastic lenses of the lighting system, and lowering the cost of the system.

While this invention has been described with respect to at least one embodiment, the invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

REFERENCE NUMBER LISTING

B bicycle
10 lighting system
12 light source
14 visible light
16 non-visible light/UV light
18 reflectance material
20 visible light
22 control/switch or button
24 body
30 lighting system
32 handheld flashlight
34 (visible) light(s)/LEDs
36 (UV) light(s)/LEDs
40 lighting system
42 flashlight
44 light sensor(s)
46 control device
50 lighting system
52 lighting device
54 visible light
56 non-visible light/UV light
58 reflectance material
60 visible light
62 object
70 object
72 Vehicle Control Unit (VCU)
74 visible light source
76 UV light source
78 body
90 lighting system
92 lighting device
94 control device
96 visible light source
98 ultraviolet light source
100 light sensor
120 lighting system/monitoring system
122 visible and/or non-visible light source(s)
124 visible and/or non-visible light source(s)
140 lighting system
142 visible light source
144 non-visible/UV light source
146 visible light
148 non-visible light/UV light
150 body
152 control switch or button
154 light sensor(s)
156 control device
200 lighting system
202 vehicle or other transportation device
204 poorly illuminated area
206 lighting device
208 body
210 zone 1
212 zone 2
214 zone 3
216 light/motion/heat/people sensor
218 non-visible/UV light source
220 UV light
222 Camera
224 personnel
226 reflectance apparel
228 wireless device
300 graph of absorption efficiency versus wavelength
302 frequency axis
304 absorption efficiency axis
306 absorption spectra of common fluorescence materials
308 Gaussian distribution of wavelengths of 365 nm UV LED
310 Gaussian distribution of wavelengths of 385

What is claimed is:

1. A lighting system, comprising:
a lighting device configured to be connected to an object, the lighting device comprising:
a body;
at least one visible light source connected to the body, the at least one visible light source being configured for emitting visible light; and
at least one ultraviolet light source connected to the body, the at least one ultraviolet light source being configured for emitting ultraviolet light, the at least one ultraviolet light source being operably coupled to the at least one visible light source;
wherein the lighting device is configured for strobing the at least one visible light source and the at least one ultraviolet light source by turning the at least one ultraviolet light source on upon the at least one visible light source turning off and turning the at least one ultraviolet light source off upon the at least one visible light source turning on such that a reflectance material of an object, which is not being illuminated by the at least one visible light source, is illuminated by the at least one ultraviolet light source; and
wherein the at least one ultraviolet light source emits ultraviolet light in a wavelength range from 10 nm to 445 nm, wherein
the lighting device further includes a control device operably connected to the at least one visible light source and the at least one ultraviolet light source, the control device being configured for turning on and turning off the at least one visible light source and the at least one ultraviolet light source, and the lighting device further includes at least one light sensor operably connected to the control device, the at least one light sensor being configured for sensing ambient light, wherein the control device is configured for turning the at least one ultraviolet light source on and off responsive to the sensed ambient light.

2. The lighting system of claim 1, wherein the at least one ultraviolet light source emits ultraviolet light in a wavelength range from 315 nm to 400 nm.

3. The lighting system of claim 1, wherein the at least one ultraviolet light source emits ultraviolet light in a wavelength range from 385 nm to 445 nm.

4. The lighting system of claim 1, wherein the control device is configured for strobing the at least one visible light source and maintaining the at least one ultraviolet light source in an off state upon the at least one light sensor sensing a sufficient amount of ambient light.

5. A lighting system, comprising:
a lighting device configured to be connected to an object, the lighting device comprising:
a body;
at least one ultraviolet light source connected to the body, the at least one ultraviolet light source being configured for emitting ultraviolet light;
wherein the lighting device is configured for cooperating with at least one existing visible light source;
wherein the lighting device is configured for turning on and turning off the at least one ultraviolet light source in cooperation with the at least one existing visible light source;
wherein the lighting device is a stand-alone lighting device; and
wherein the at least one ultraviolet light source emits ultraviolet light in a wavelength range from 10 nm to 445 nm, wherein
the lighting device further includes a control device operably connected to the at least one ultraviolet light source, the control device being configured for turning on and turning off the at least one ultraviolet light source, and
the lighting device further includes at least one light sensor operably connected to the control device, the at least one light sensor being configured for sensing visible light from the at least one existing visible light source.

6. The lighting system of claim 5, wherein the at least one ultraviolet light source emits ultraviolet light in a wavelength range from 315 nm to 400 nm.

7. The lighting system of claim 5, wherein the at least one ultraviolet light source emits ultraviolet light in a wavelength range from 385 nm to 445 nm.

8. The lighting system of claim 7, wherein the lighting device is configured for receiving a signal from the at least one existing visible light source, the signal being determinative of whether the at least one existing visible light source is on or off, wherein the lighting device is configured for turning on and turning off the at least one ultraviolet light source in dependence upon the signal.

9. A lighting device configured to be attached to a transportation device, the lighting device comprising:
a body;
at least one forward facing visible light source connected to the body, the at least one forward facing visible light source being configured for emitting visible light in a forward direction relative to the transportation device;
at least one rearward facing ultraviolet light source connected to the body, the at least one rearward facing ultraviolet light source being configured for emitting ultraviolet light in a rearward direction relative to the transportation device such that a reflectance material of an object, which is not being illuminated by the at least one forward facing visible light source, is illuminated by the at least one rearward facing ultraviolet light source;
a control device operably connected to the at least one forward facing visible light source and to the at least one rearward facing ultraviolet light source, the control device being configured for turning on and off the at least one forward facing visible light source and the at least one rearward facing ultraviolet light source;
at least one light sensor operably connected to the control device, the at least one light sensor being configured for sensing ambient light and for providing a signal to the control device, wherein the control device is configured for turning the at least one rearward facing ultraviolet light source on and off responsive to the signal of the at least one light sensor; and
wherein the at least one rearward facing ultraviolet light source emits ultraviolet light in a wavelength range from 10 nm to 445 nm.

10. The lighting system of claim 9, wherein the at least one rearward facing ultraviolet light source emits ultraviolet light in a wavelength range from 315 nm to 400 nm.

11. The lighting system of claim 9, wherein the at least one rearward facing ultraviolet light source emits ultraviolet light in a wavelength range from 385 nm to 445 nm.

12. The lighting device of claim 9, wherein:
the control device is further configured for strobing the at least one forward facing visible light source and the at least one rearward facing ultraviolet light source by turning the at least one rearward facing ultraviolet light source on upon the at least one forward facing visible light source turning off and turning the at least one rearward facing ultraviolet light source off upon the at least one forward facing visible light source turning on.

13. The lighting device of claim 12, wherein:
the control device is further configured for strobing the at least one forward facing visible light source and maintaining the at least one rearward facing ultraviolet light source in an off state upon the at least one light sensor sensing a sufficient amount of ambient light.

14. A lighting system, comprising:
a lighting device configured to be connected to an object, the lighting device comprising:
a body;
a control device;
at least two ultraviolet light sources connected to the body and operably coupled to the control device, the at least two ultraviolet light sources being configured for emitting ultraviolet light;
at least one sensing device connected to the body, the at least one sensing device being configured to determine whether any of at least two areas or zones adjacent to the lighting device are poorly visibly illuminated and/or occupied by personnel;

wherein the lighting device is configured to illuminate with ultraviolet light any of the at least two areas or zones adjacent to the lighting device upon a determination that the area or zone concerned is poorly visibly illuminated and/or occupied by personnel; and wherein the at least two ultraviolet light sources emit ultraviolet light in a wavelength range from 10 nm to 445 nm.

15. The lighting system of claim 14, wherein the at least two ultraviolet light sources emit ultraviolet light in a wavelength range from 315 nm to 400 nm.

16. The lighting system of claim 14, wherein the at least two ultraviolet light sources emit ultraviolet light in a wavelength range from 385 nm to 445 nm.

17. The lighting system of claim 14, wherein:
the lighting system being configured to operate in conjunction with existing emergency visible lighting and/or flashing visible light systems by using the at least one sensing device to sense constant or intermittent visible illumination of each individual area or zone provided by said existing emergency visible lighting and flashing visible light systems.

18. The lighting system of claim 14, wherein:
the lighting system being configured to operate in conjunction with existing emergency visible lighting and/or flashing visible light systems by using a wired or wireless connection with such emergency visible lighting and/or flashing visible light systems to determine constant or intermittent visible illumination of each individual area or zone provided by said existing emergency visible lighting and flashing visible light systems.

19. The lighting system of claim 14, wherein:
the lighting system being configured to operate in conjunction with existing emergency visible lighting and/or flashing visible light systems by sensing and/or determining intermittent visible illumination of each individual area or zone provided by said existing emergency visible lighting and flashing visible light systems; and the lighting system being further configured to synchronize the illumination of each individual area or zone in ultraviolet light with the intermittent absence of visible light illumination in each individual area or zone from said existing emergency visible lighting and flashing visible light systems.

20. The lighting system of claim 19, wherein:
the lighting system being further configured to intermittently synchronize the illumination of each individual area or zone in ultraviolet light with the intermittent absence of visible light illumination in each individual area or zone from said existing emergency visible lighting and flashing visible light systems.

* * * * *